US009141670B2

(12) United States Patent
Branscome et al.

(10) Patent No.: US 9,141,670 B2
(45) Date of Patent: Sep. 22, 2015

(54) METHODS AND SYSTEMS FOR HARDWARE ACCELERATION OF STREAMED DATABASE OPERATIONS AND QUERIES BASED ON MULTIPLE HARDWARE ACCELERATORS

(75) Inventors: Jeremy L. Branscome, Santa Clara, CA (US); Michael Paul Corwin, Sunnyvale, CA (US); Joseph Irawan Chamdani, Santa Clara, CA (US); Rajasekhar Cherabuddi, Saratoga, CA (US)

(73) Assignee: Teradata US, Inc., Dayton, OH (US)

( * ) Notice: Subject to any disclaimer, the term of this patent is extended or adjusted under 35 U.S.C. 154(b) by 0 days.

(21) Appl. No.: 13/172,792

(22) Filed: Jun. 29, 2011

(65) Prior Publication Data

US 2012/0047126 A1    Feb. 23, 2012

Related U.S. Application Data

(60) Provisional application No. 61/359,407, filed on Jun. 29, 2010.

(51) Int. Cl.
*G06F 17/30* (2006.01)
(52) U.S. Cl.
CPC .............................. *G06F 17/30519* (2013.01)

(58) Field of Classification Search
CPC ................... G06F 17/30442; G06F 17/30477; G06F 17/30675; G06F 17/30424; G06F 17/30471; G06F 17/30463; G06F 9/505; G06F 9/5044; G06F 9/30043; G06F 9/3004
USPC .......................................... 707/714, 713, 718
See application file for complete search history.

(56) References Cited

U.S. PATENT DOCUMENTS

| | | | | |
|---|---|---|---|---|
| 5,544,357 | A | * | 8/1996 | Huei .............................. 707/715 |
| 2004/0117037 | A1 | * | 6/2004 | Hinshaw et al. .................. 700/2 |
| 2011/0219020 | A1 | * | 9/2011 | Oks et al. ...................... 707/769 |

* cited by examiner

*Primary Examiner* — Robert Beausoliel, Jr.
*Assistant Examiner* — Alexandria Bromell
(74) *Attorney, Agent, or Firm* — Monument IP Law Group; James Stover; Ramin Mahboubian

(57) ABSTRACT

Embodiments of the present invention provide a hardware accelerator that assists a host database system in processing its queries. The hardware accelerator comprises special purpose processing elements that are capable of receiving database query/operation tasks in the form of machine code database instructions, execute them in hardware without software, and return the query/operation result back to the host system.

38 Claims, 19 Drawing Sheets

RDBMS Node with Accelerator

PHYSTACK

METHODS AND SYSTEMS FOR HARDWARE ACCELERATION OF STREAMED DATABASE OPERATIONS AND QUERIES BASED ON MULTIPLE HARDWARE ACCELERATORS

CROSS-REFERENCE TO RELATED APPLICATIONS

This application claims priority to U.S. Provisional Patent Application No. 61/359,407, filed on Jun. 29, 2010, entitled Methods and Systems for Hardware Acceleration of Operations and Queries based on Multiple Hardware Accelerators, which is herein incorporated by reference in its entirety. This application is related to the following U.S. Patent Applications and Patents, which are herein incorporated by reference in their entirety: U.S. patent application Ser. No. 11/895,952, filed on Aug. 27, 2007, entitled Methods and Systems for Hardware Acceleration of Database Operations and Queries, by Joseph I. Chamdani et al.; U.S. patent application Ser. No. 11/895,998, filed on Aug. 27, 2007, entitled Hardware Acceleration Reconfigurable Processor for Accelerating Database Operations and Queries, by Jeremy Branscome et al.; U.S. patent application Ser. No. 11/895,997, filed on Aug. 27, 2007, entitled Processing Elements of a Hardware Acceleration Reconfigurable Processor for Accelerating Database Operations and Queries, by Jeremy Branscome et al.; U.S. patent application Ser. No. 12/144,486, filed on Jun. 23, 2008, entitled Methods and Systems for Real-time Continuous Updates, by Kapil Surlaker et al.; U.S. patent application Ser. No. 12/099,131, filed on Apr. 7, 2008, entitled Accessing Data in a Column Store Database Based on Hardware Compatible Data Structures, by Liuxi Yang et al.; U.S. patent application Ser. No. 12/099,133, filed on Apr. 7, 2008, entitled Accessing Data in a Column Store Database Based on Hardware Compatible Data Structures, by Liuxi Yang et al.; U.S. patent application Ser. No. 12/099,133, filed on Apr. 7, 2008, entitled Accessing Data in a Column Store Database Based on Hardware Compatible Indexing and Replicated Reordered Columns, by Krishnan Meiyyappan et al.; and U.S. patent application Ser. No. 12/144,303, filed on Jun. 23, 2008, entitled Fast Bulk Loading and Incremental Loading of Data into a Database, by James Shau et al.

FIELD

This invention relates generally to database systems. More particularly, it relates to database systems that are optimized by using hardware acceleration.

BACKGROUND

Despite their different uses, applications, and workload characteristics, most systems run on a common Database Management System (DBMS) using a standard database programming language, such as Structured Query Language (SQL). Most modern DBMS implementations (Oracle, IBM DB2, Microsoft SQL, Sybase, MySQL, PostgreSQL, Ingress, etc.) are implemented on relational databases, which are well known to those skilled in the art.

Typically, a DBMS has a client side where applications or users submit their queries and a server side that executes the queries. On the server side, most enterprises employ one or more general-purpose servers. However, although these platforms are flexible, general-purpose servers are not optimized for many enterprise database applications. In a general purpose database server, all SQL queries and transactions are eventually mapped to low level software instructions called assembly instructions, which are then executed on a general purpose microprocessor (CPU). The CPU executes the instructions, and its logic is busy as long as the operand data are available, either in the register file or on-chip cache. To extract more parallelism from the assembly code and keep the CPU pipeline busy, known CPUs attempt to predict ahead the outcome of branch instructions and execute down the code path speculatively. Execution time is reduced if the speculation is correct; the success of this speculation, however, is data dependent. Other state-of-the-art CPUs attempt to increase performance by employing simultaneous multithreading (SMT) and/or multi-core chip multiprocessing (CMP). To take advantage of these, changes have to be made at the application or DBMS source code to manually create the process/thread parallelism for the SMT or CMP CPUs. This is generally considered highly as very complex to implement and not always applicable to general purpose CPUs because it is workload dependent.

Unfortunately, general purpose CPUs are not efficient for database applications. Branch prediction is generally not accurate because database processing involves tree traversing and link list or pointer chasing that is very data dependent. Known CPUs employ the well-known instruction-flow (or Von Neumann) architecture, which uses a highly pipelined instruction flow (rather than a data-flow where operand data is pipelined) to operate on data stored in the CPUs tiny register files. Real database workloads, however, typically require processing Gigabytes to Terabytes of data, which overwhelms these tiny registers with loads and reloads. On-chip cache of a general purpose CPU is not effective since it's relatively too small for real database workloads. This requires that the database server frequently retrieve data from its relatively small memory or long latency disk storage. Accordingly, known database servers rely heavily on squeezing the utilization of their small system memory size and disk input/output (I/O) bandwidth. Those skilled in the art recognize that these bottlenecks between storage I/O, the CPU, and memory are very significant performance factors.

However, overcoming these bottlenecks is a complex task because typical database systems consist of several layers of hardware, software, etc., that influence the overall performance of the system. These layers comprise, for example, the application software, the DBMS software, operating system (OS), server processor systems, such as its CPU, memory, and disk I/O and infrastructure. Traditionally, performance has been optimized in a database system "horizontally," i.e., within a particular layer. For example, many solutions attempt to optimize various solutions for the DBMS query processing, caching, the disk I/O, etc. These solutions employ a generic, narrow approach that still fails to truly optimize the large performance potentials of the database system, especially for relational database systems having complex read-intensive applications.

Accordingly, it would be very desirable to provide a more complete solution for database systems than what is currently available.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Figure 1:
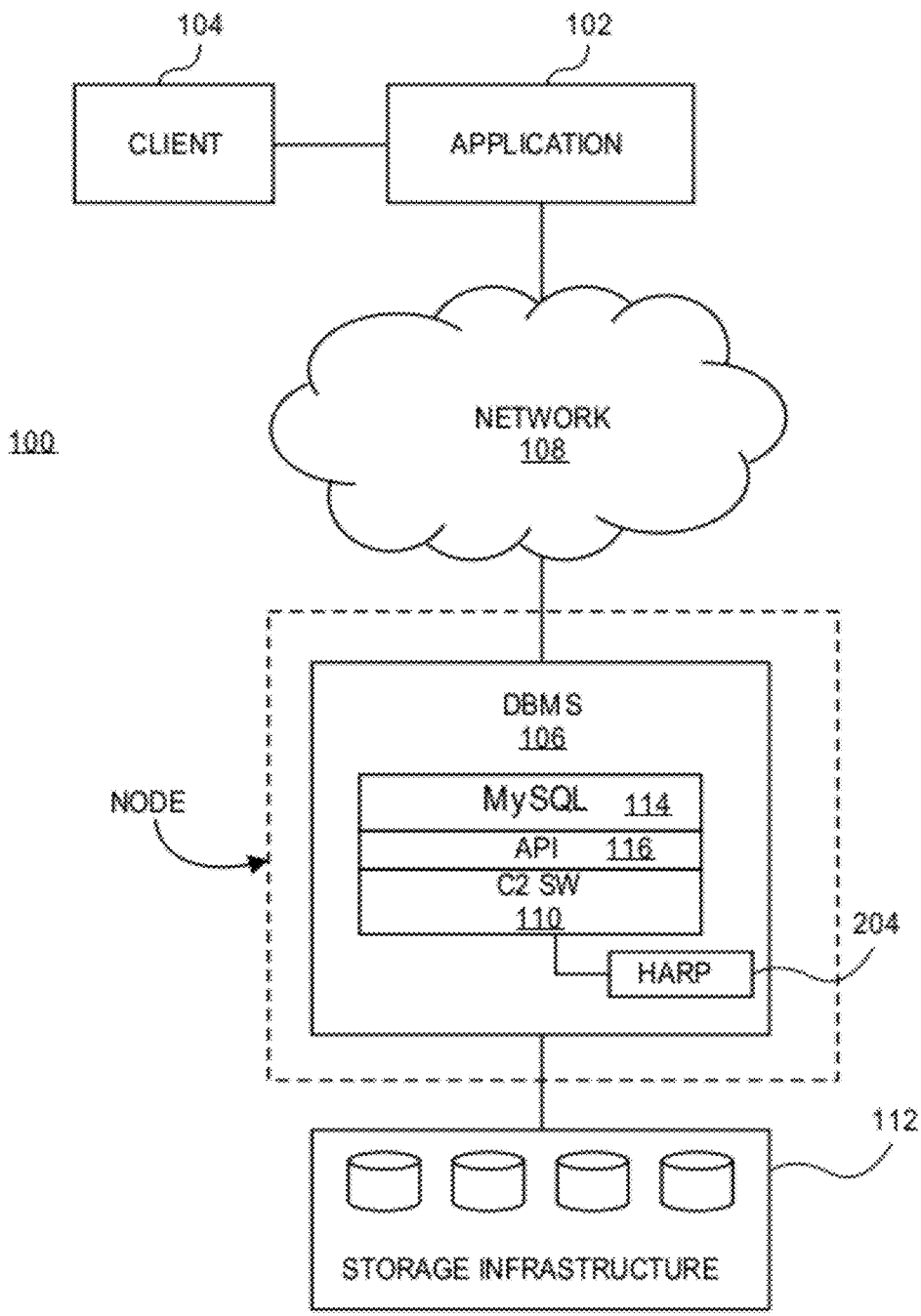
FIG. 1 illustrates an exemplary system that is consistent with the principles of the present invention.

In order to accelerate query processing, embodiments of the present invention may analyze a query and break it down into its tasks. The embodiments may then use hardware execution resources or software execution resources to process the query. The hardware execution resources, referred to as query processing modules (QPMs), may utilize database machine code instructions known as MOPs to perform a particular task of a query. The software execution resources, referred to as query software modules (QSMs), are implemented in software and may utilize software operations known as SOPs to perform their tasks of the query. To help illustrate the embodiments, the distinction between software execution of SOPs and hardware execution of MOPs may now be further described.

A SOP is one or more instructions that are executed with software. That is, a SOP is executed by a QSM running on a general-purpose CPU, such as an x86 processor from Intel. In addition, the QSM provides communications interface for coordination with other tasks being performed by another resource, such as one or more QSMs or one or more other QPMs.

Alternatively, a MOP is one or more instructions that are executed with hardware. In particular, a MOP is executed in hardware as database machine code instructions on custom hardware, such as a HARP, in what is referred to as a Query Processing Module (QPM). Such custom hardware is also described in the related applications, which are incorporated by reference.

When processing a query, the QPMs and QSMs may cooperate with each other to execute the task in parallel, or in a pipelined fashion to expedite processing.

One embodiment relates to utilizing multiple hardware accelerators to assist in query processing. In particular, a system may comprise: at least one BSM running a database management system; a set of query processing modules (QPM) each coupled to the at least one BSM. A QPM is implemented using custom hardware and provides a physical execution environment for database machine code instructions, such as Macro-Operations (MOPs). The QPMs may be interconnected to allow for allowing concurrent, parallel communication between any host and any QPM. The system may use fast storage other than disk (e.g. SSDs, RAM appliances, flash appliances, etc.). The QPMs may be interconnected that are a combination of PCIe, IB, GIGE, HT, SATA, SAS, or another protocol.

In addition to the QPMs, one or more BSMs may comprise software modules to assist in processing a query. For purposes of brevity, the present disclosure shall refer to these software-based resources as query software modules (QSM). A QSM may be implemented within the BSM or on one or more servers, called Compute Server Modules (CSMs), which are coupled to the BSM. In addition, a particular hardware platform, such as the host BSM or a CSM, may comprise multiple QSMs.

A QSM is a module (virtual machine) that is implemented in software and functions as an execution engine for software operations (SOPs), which provides a virtual environment in which the SOPs can execute. In some embodiments, a QSM can be viewed as a software-equivalent to a QPM. A QSM also provides a means of I/O for MOPs and SOPs.

In the embodiments, a QSM may comprise a base server (herein a BSM), i.e., a general-purpose computer or server, which is configured with software to implement the QSM virtual machine. Of note, such a BSM or a CSM may implement multiple virtual QSMs. In addition, each BSM and CSM can have their own hardware and network connections.

To facilitate the sharing of information, memory may be shared between QPMs and QSMs. In one embodiment, a system implements shared memory among the dataflow processing elements, such that any given dataflow processing element has access to the same memory as any other dataflow processing element.

Moreover, processing flows may be shared between multiple QPMs and QSMs. For example, the processing output of a first QPM may be fed to a second QPM or a QSM, and vice versa. In one embodiment, a system implements a shared flow among the dataflow processing elements, such that any given query processing resource, i.e., a QPM or QSM, may transmit its flow to at least one of any other query processing resource. Those skilled in the art will understand that a QPM or QSM may transmit multiple flows, i.e., based on multiple SOPs or MOPS. These embodiments may have several advantages and features.

Figure 10:
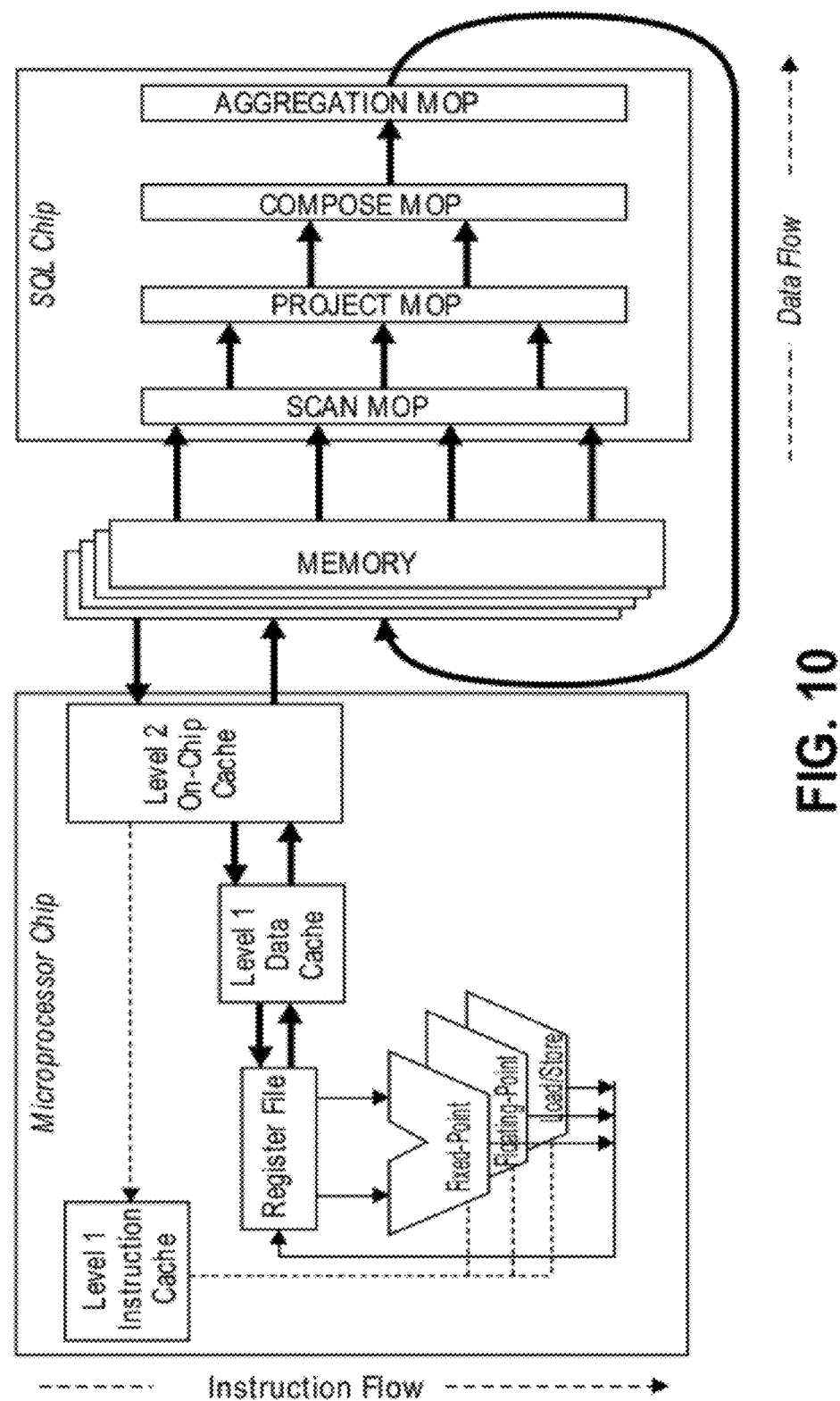
FIG. 10 conceptually illustrates the difference between instruction-flow architecture machines versus data-flow architecture machines.

Of note, FIG. 10 helps illustrate the concept of a dataflow as employed in the embodiments of the present disclosure. As shown, with a data-flow machine, intermediate query results do not need to be materialized in memory or on disk. In addition, an entire query from data to result may execute as dataflow within data-flow machines as described by the present disclosure.

In some embodiments, the processing by the data-flow machines are fully pipelined for high concurrency and throughput. On-chip flow control buffering may be used to eliminate memory traffic. In addition, initial disk read and final result are then communicated to a database management system.

In some instances, the data-flow architecture of the present embodiments enables reduction in I/O and improves performance equivalent to a large cluster of CPU cores, such as those utilized in conventional system.

Figure 11:
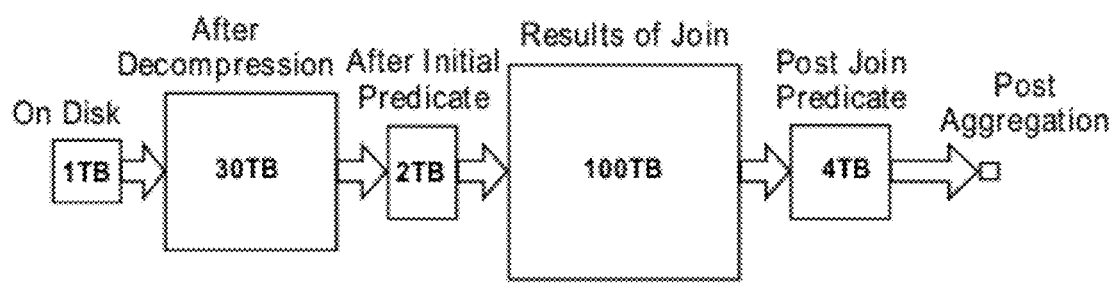
FIG. 11 illustrates an exemplary benefit of data-flow architecture machines in reducing I/O and memory resource bottlenecks.
Figure 12:
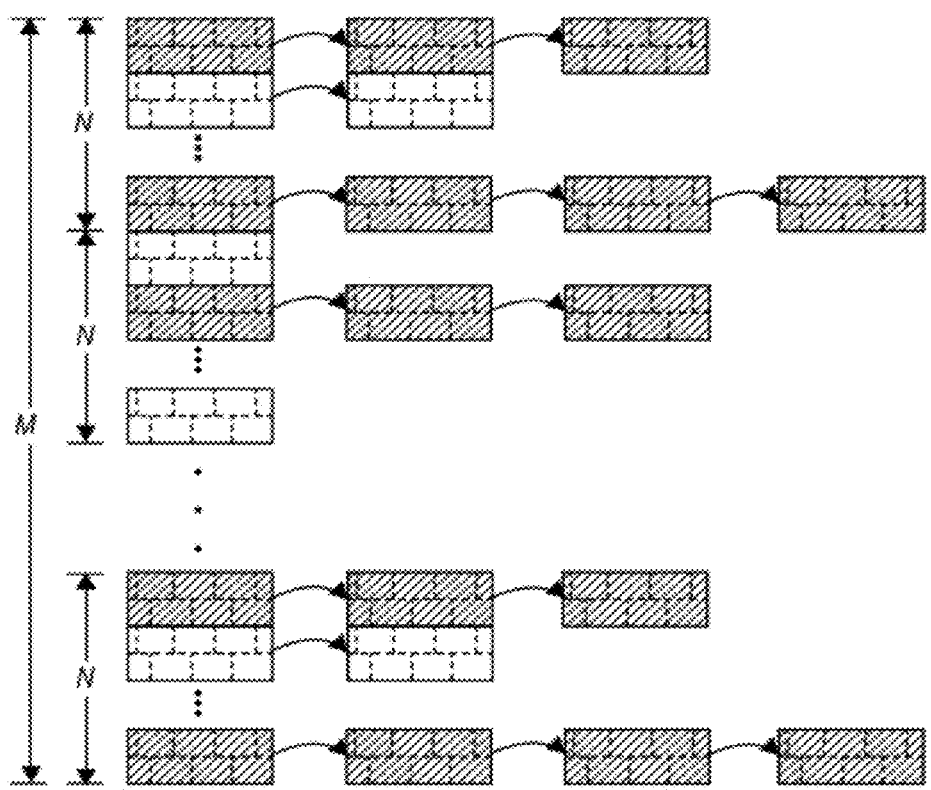
FIG. 12 illustrates an exemplary benefit of a group index and pipeline parallelism employed by embodiments of the present invention.
Figure 13:
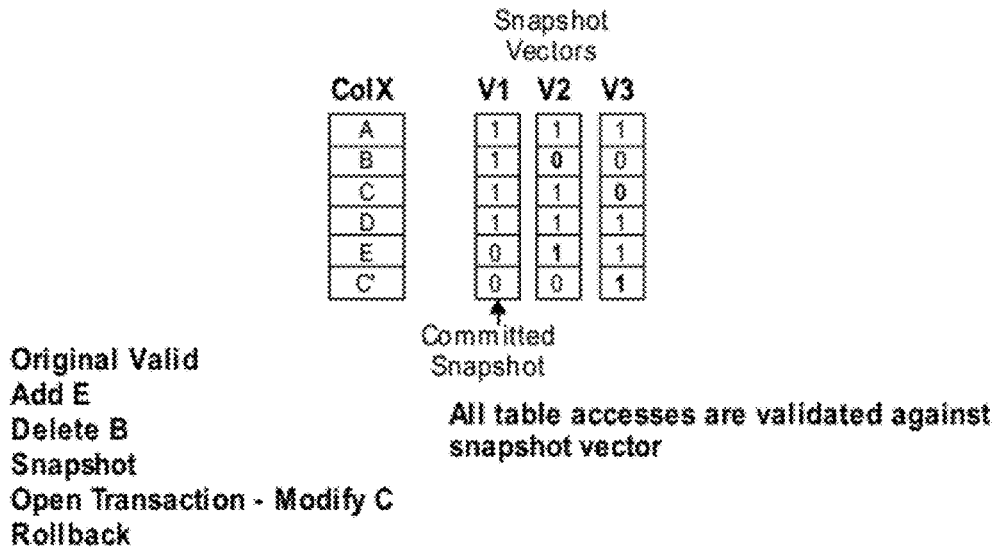
FIG. 13 illustrates an exemplary use of snapshot version vector management employed by embodiments of the present invention.
Figure 14:
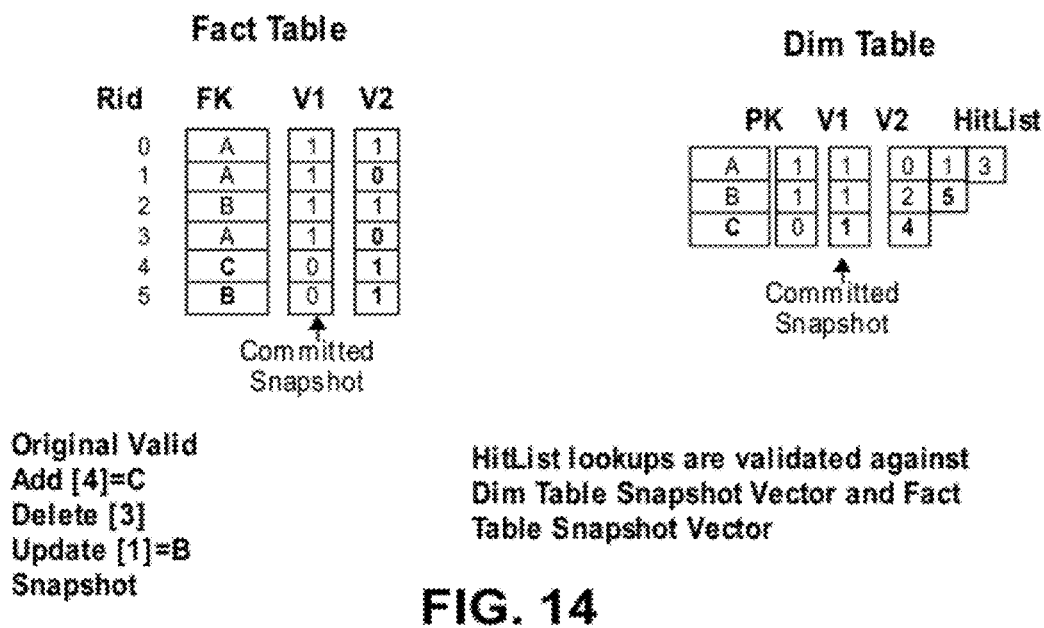
FIG. 14 illustrates an exemplary use of snapshot version vectors with a hitlist employed by embodiments of the present invention.
Figure 15:
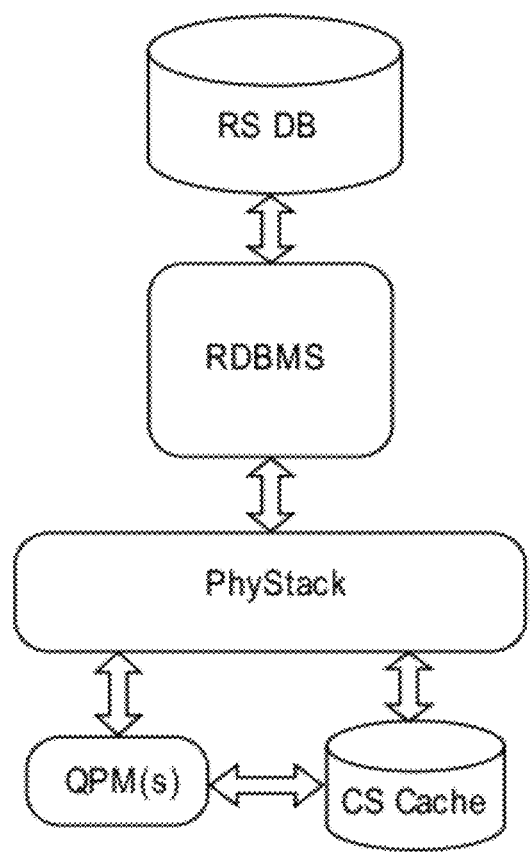
FIG. 15 illustrates an exemplary architecture for integrating embodiments of the present invention with a relational or row-store (RS) type of database management system.

FIG. 11 illustrates an exemplary benefit of data-flow architecture machines in reducing I/O and memory resource bottlenecks. As shown, MOP threads may participate fairly in accessing index memory and execution. Data can be executed fairly by availability, e.g., in a non-blocking fashion.

Furthermore, in some embodiments, MOP threads may prefetch with dataflow locality and MOP threads may lookahead. In various embodiments, packed nodes contain relevant RIDs and no additional index locality is required or assumed.

For purposes of brevity, the following abbreviations are used in this disclosure.

STSD (Single Task Single Data): One QPM, one task on same portion of data.

STMD (Single Task Multi Data): One QPM, one task, executed iteratively, consuming multiple distinct portions of data.

MTMD (Multi Task Multi Data): One QPM, multiple tasks, executing in pipelined, parallel fashion consuming multiple distinct portions of data.

SPSF (Single Program Single Flow): Multiple QPMs, at least one task per (all tasks from same query), executing in pipelined, parallel fashion, where any given QPM is configured to execute in either STSD, STMD, or MTMD.

SPMF (Single Program Multi Flow): Multiple QPMs, at least one task per (all tasks from same query), executing in parallel fashion, where any given QPM is configured to execute in either STSD, STMD, and/or MTMD.

MPSF (Multi Program Single Flow): Multiple QPMs, at least one task per (at least two programs represented), executing in independent pipelined, parallel fashion, where each program is being executed as SPSF.

MPMF (Multi Program Multi Flow): Multiple QPMs, at least one task per (at least two programs represented), executing in parallel fashion, where each query is being executed as SPMF.

Hardware multi-tasking enables MTMD for at least one query (program) on a single QPM. Hardware system partitioned execution allows multiple tasks to be executed concurrently on one or more independent QPM parallel execution of MPMF.

Hierarchical aggregation that permits partial aggregation of results and where the results are transferred (utilizing hardware system pipelining) from one QPM or host to another QPM or host and further aggregated so as to minimize the number of transfers required. Hardware task pipelining permits any individual QPM to execute a query plan operation over distinct portions of database data that implements STMD and MTMD.

In the embodiments, the resources of the system may be pipelined. That is, processing resources, i.e., QSMs or QPMs, may be configured in a sequence, so that the output of one resource as the input of the next resource and so forth. Pipelining may occur between software resources, i.e., QSM-QSM, hardware resource, i.e., QPM-QPM, and mixed resources, such as QSM-QPM or QPM-QSM.

Software system pipelining such that multiple QPMs can transfer multiple dataflows to a QSM, and/or a QSM can transfer multiple dataflows to multiple QPMs. Such pipelining can provide pipelined execution of database operations on dataflow (filter, join, aggregate, etc.), pipelined execution of SPSF involving multi-QPM and multi-host, execution of database operations on portions of database (from storage), and disk filtering.

Portions of the database needed for subsequent execution may also be dynamically discovered. For example, only the portions of the database that are necessary are fetched by snooping execution and preparing data for subsequent tasks Hardware partitioning is provided to allow one or more QPMs to implement machine database code execution capable of partitioning a portion of multiple database tables or indexes according to an optimizer-determined mapping of partitions, which may then optimize query plan execution in SPMF and MPMF.

Static index partitioning enables indexes that are statically partitioned and stored according to pre-determined optimal execution locality for SPMF and MPMF. In some embodiments, these are managed independently and can include an update portion of the index, which is not necessarily partitioned. Static data partitioning is where database tables are statically partitioned and stored according to pre-determined optimal execution locality for SPMF and MPMF.

Mixed mode execution may be optimized wherein some QPMs execute SPSF (for pipeline parallelism), while other QPMs execute SPMF (for data parallelism) in a manner which optimizes execution. This can include MPSF and MPMF when more than one query is involved in concurrent execution.

Hardware system pipelining enables multiple live dataflow transmission from one QPM to multiple QPMs, and/or from multiple hosts to a QPM, and/or from multiple QPM to a host to implement SPSF (and MPSF or MPMF), provide partitioning/repartitioning, and dynamic distribution/redistribution of database data in a manner, which optimizes parallel query plan execution on SPMF or MPMF. One skilled in the art will recognize that a QPM can emit multiple flows to another QPM, and likewise, a QPM can emit multiple flows to multiple QPMs.

In other embodiments, query execution planning can be based on the use of multiple hardware accelerators. In some embodiments, algorithms for utilizing multiple QPMs take advantage of their bulk processing capability.

The present disclosure relates to various embodiments for accelerating query processing. In one embodiment, a database hardware compute node can be scaled up using, for example, a hybrid configuration of multiple QPMs, QSMs, shared SAMs, dual BSMs, and shared flow concept. The scaling up may be performed using a multi-QPM architecture with shared flows; static and dynamic partitioning of base table columns and indexes across QPMs/QSMs; pipelining of MOP tasks, SOP tasks, MOP-SOP mixed tasks; task scheduling and memory management across multiple QPMs; and using methods to optimize a query plan based on scaled up nodes.

In addition, the present disclosure relates to streaming integration of SQL chip in row store DBMS. For example, methods are provided for streaming acceleration at row block level, such as MOPs to accelerate hybrid row store conversion, compression/decompression, encryption/decryption, etc. Other methods are provided for streaming acceleration at the SQL operator level. For example, MOPs are provided for projection, predicate filtering, group by aggregation, order by limit, hash join, sorted merge join, merge sort, analytics function, etc.

Dataflow integration of SQL chip and column store in MPP-based row store DBMS are also provided in the present disclosure. For example, streaming acceleration with partial dataflow of a logical SQL operator is provided, such as a TableScan operator can be accelerated using a pipeline that is based on a decryption MOP, a decompression MOP, a column projection MOP, and a redicate filtering MOP. Caching of hot columns and intermediate results and methods to update the cache with ACID compliance are also provided. Furthermore, methods are provided to optimize a query plan across MPP nodes having dataflow SQL chip acceleration, such as, col-located query fragments that have been dispatched to an MPP node. Methods and systems may be provided to minimize data exchanges across MPP node via hardware-based Hardware-based snapshot versioning is also provided in the present disclosure. For example, MVCC-like support is provided for query-while-load capability. Timestamps may be represented via a snapshot version number (svn) in snapshot bitmap vectors. Methods are provided to keep track of committed versus uncommitted rows. Snapshot refresh can be accelerated via a MOP. Furthermore, a query plan can be formulated with svn filtering using snapshot bitmap vectors.

The present invention employs a custom computing (C2) solution that provides a significant gain in performance for enterprise database applications. In the C2 solution, a node or appliance may comprise the host (or base) system that is combined with a query processor module (QPM). These QPMs may comprise one or more hardware accelerated reconfigurable processors (HARP). These HARPs in a QPM are specially designed to optimize the performance of database systems and its applications, especially relational database systems and read-intensive applications.

A host system may be any standard or pre-existing DBMS system. In general, such systems may comprise a standard general purpose CPU, a system memory, I/O interfaces, etc. In some embodiments, a host system may be referred to as a base server module, i.e., a "BSM".

The QPMs are coupled to the BSM and are designed to offload repetitive database operations from the DBMS running on the BSM. The QPMs utilize dataflow architecture processing elements that execute machine code instructions that are defined for various database operations, which may be organized using macro-operations (MOPs). The C2 solution may employ a node that is scalable to include one QPM, or multiple QPMs. In addition, the C2 solution may use a federated architecture comprising multiple nodes, i.e., multiple DBMS servers that are enhanced with the C2 solution.

In some embodiments, the C2 solution employs an open architecture and co-processor approach so that the C2 hardware can be easily integrated into existing database systems. Of note, the hardware acceleration of the C2 solution utilizes novel machine code database instructions to execute certain fragments of a query in a dataflow and using parallel, pipelined execution.

In the present invention, the C2 solution also comprises software that orchestrates the operations of the DBMS running on the BSM and the QPMs. The C2 software is configured with a flexible, layered architecture to make it hardware and database system agnostic. Thus, the C2 software is capable of seamlessly working with existing DBMSs based on this open architecture.

In general, the C2 software receives the query from the DBMS and breaks the query down into query fragments. The C2 software then decides which of these query fragments can be appropriately handled in software (in the C2 software itself or back in the originating DBMS) or, ideally, with hardware acceleration in the QPMs. All or part of the query may be processed by the C2 software and QPMs.

In addition, in order to maximize the efficiency of the hardware acceleration, the C2 solution stores its databases in compressed, column-store format and utilizes various hardware-friendly data structures. The C2 solution may employ various compression techniques to minimize or reduce the storage footprint of its databases. The column-store format and hardware-friendly data structures allow the QPMs or C2 software to operate directly on the compressed data in the column-store database. The column-store database may employ columns and column groups that are arranged based on an implicit row identifier (RID) scheme and RID to primary column to allow for easy processing by the QPMs. The hardware-friendly data structures also allow for efficient indexing, data manipulation, etc. by the QPMs. Such hardware friendly data structures are described also in the related applications, which are herein incorporated by reference in their entirety.

For example, the C2 solution utilizes a global virtual address space for the entire database to greatly simplify and maximize efficiency of create, read, update, and delete operations of data in a database. In some embodiments, the columns and column groups are configured with a fixed width to allow for arithmetic memory addressing and translation from a virtual address to a physical memory address. On-demand and speculative prefetching may also be utilized by the C2 solution to hide I/O latency and maximize QPM utilization. Various indexing structures that are optimized for hardware execution of query fragments are also employed in the C2 software 110.

In some embodiments, the processing elements may share the same address space as one another. This feature allows various QPMs to share data between processing elements as well as share data between processing elements in other QPMs.

Figure 2A:
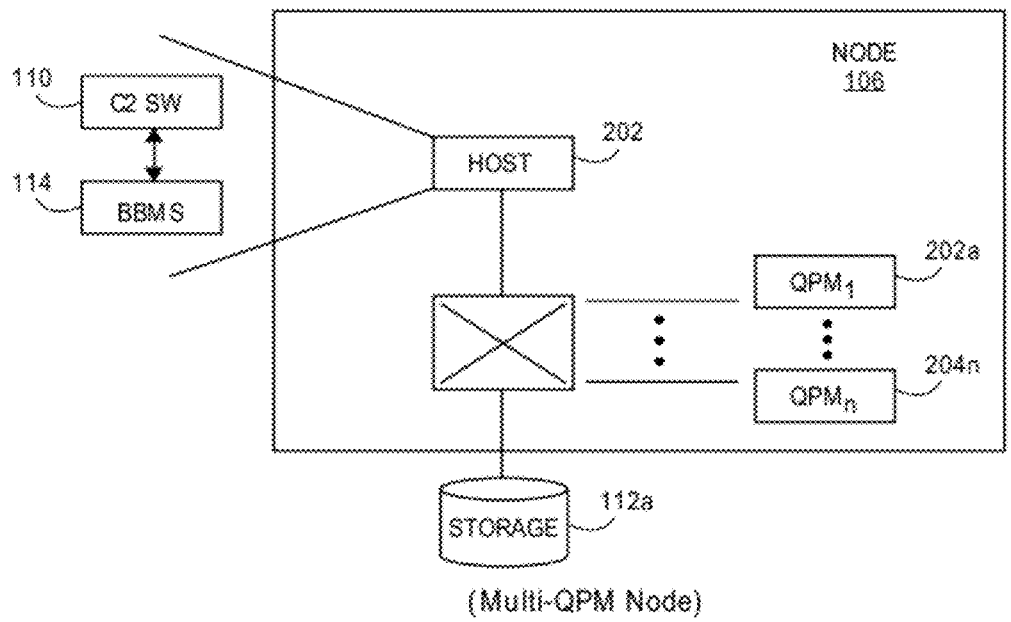
FIGS. 2A, 2B, and 2C illustrate exemplary system topologies that are consistent with the principles of the present invention.
Figure 2B:
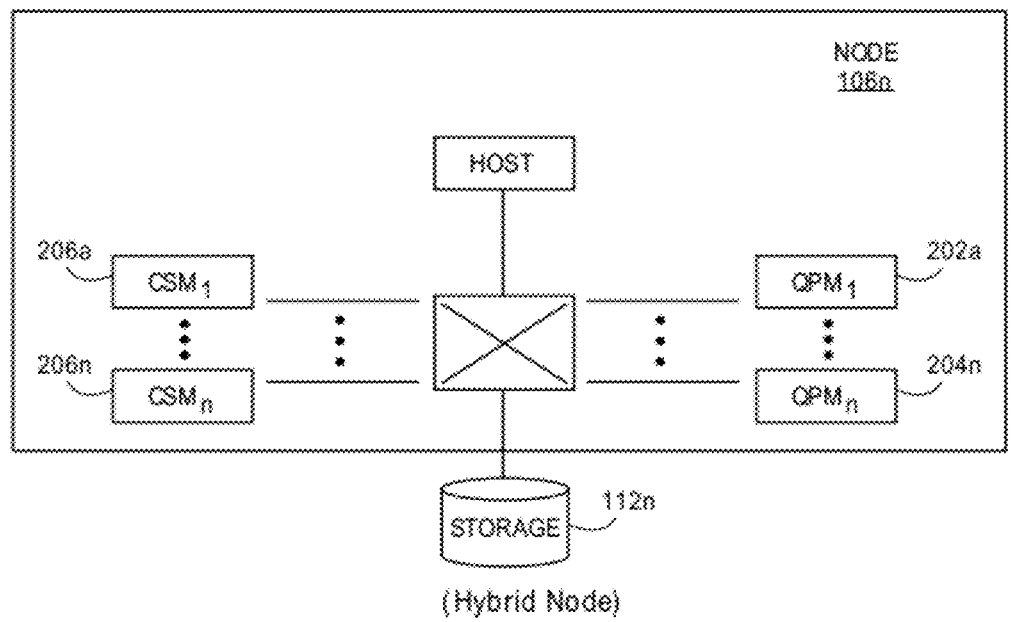
Figure 3:
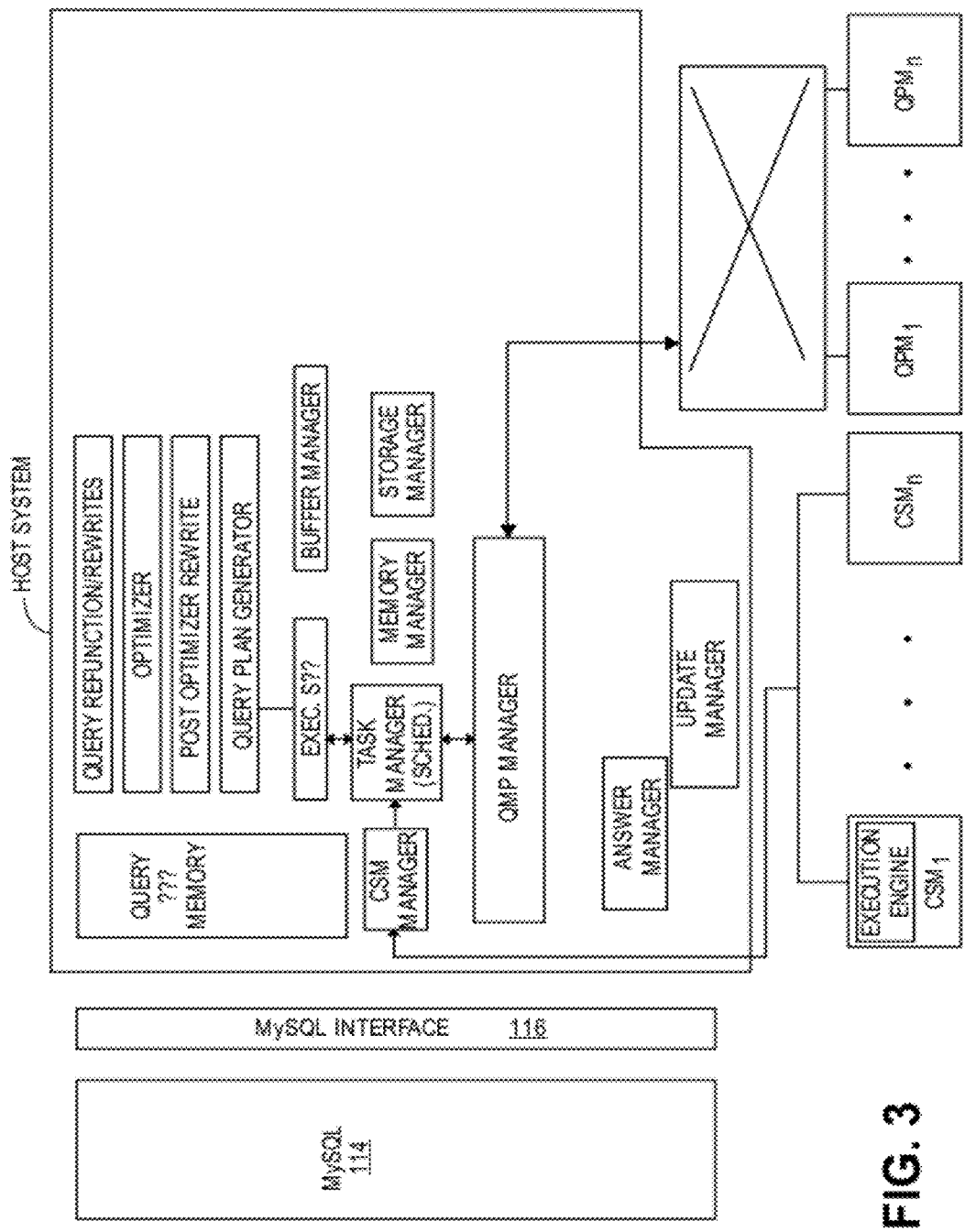
FIG. 3 illustrates an exemplary functional architecture of a system consistent with the principles of the present invention.
Figure 4:
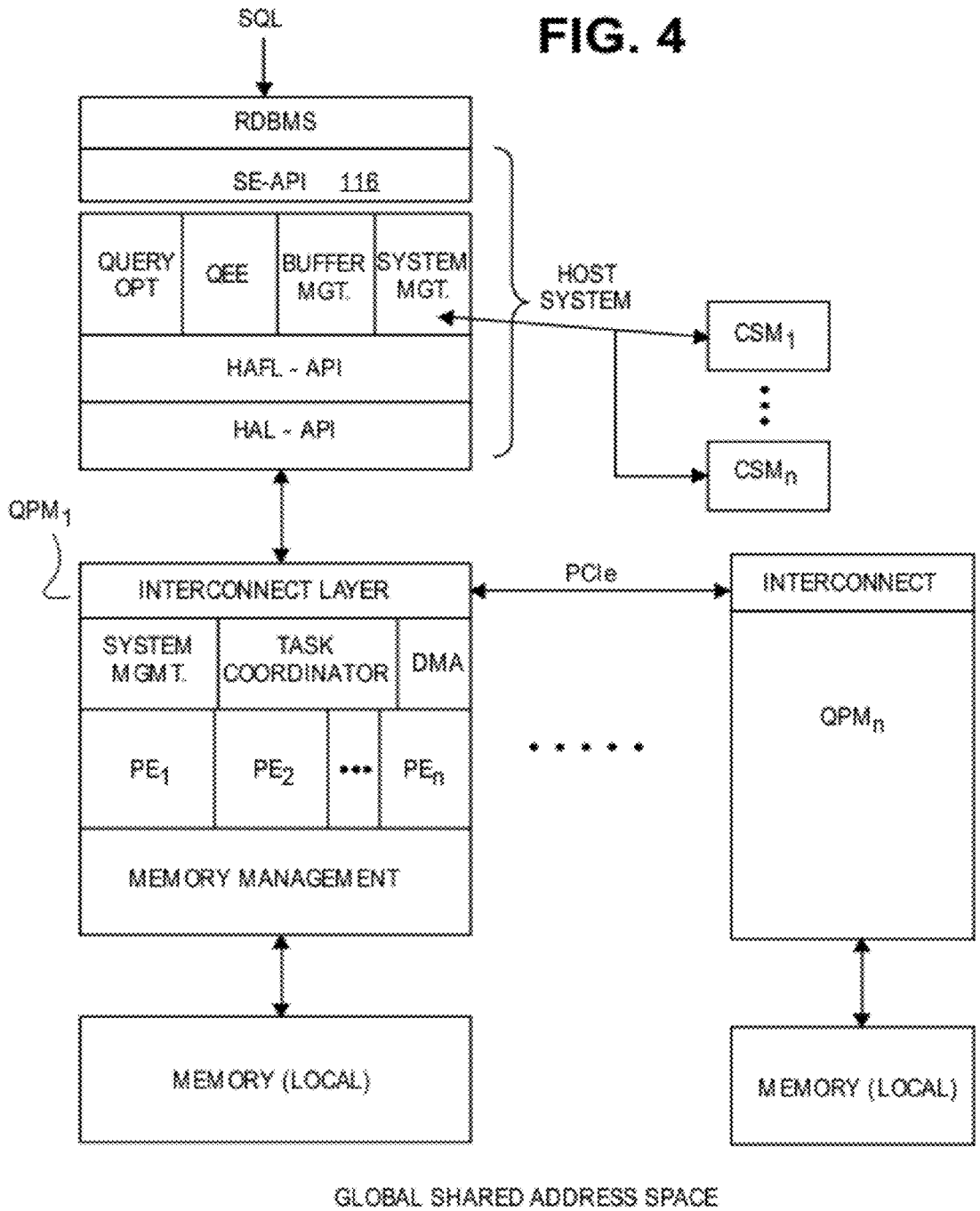
FIG. 4 illustrates an exemplary protocol stack employed by embodiments of the present invention.
Figure 5:
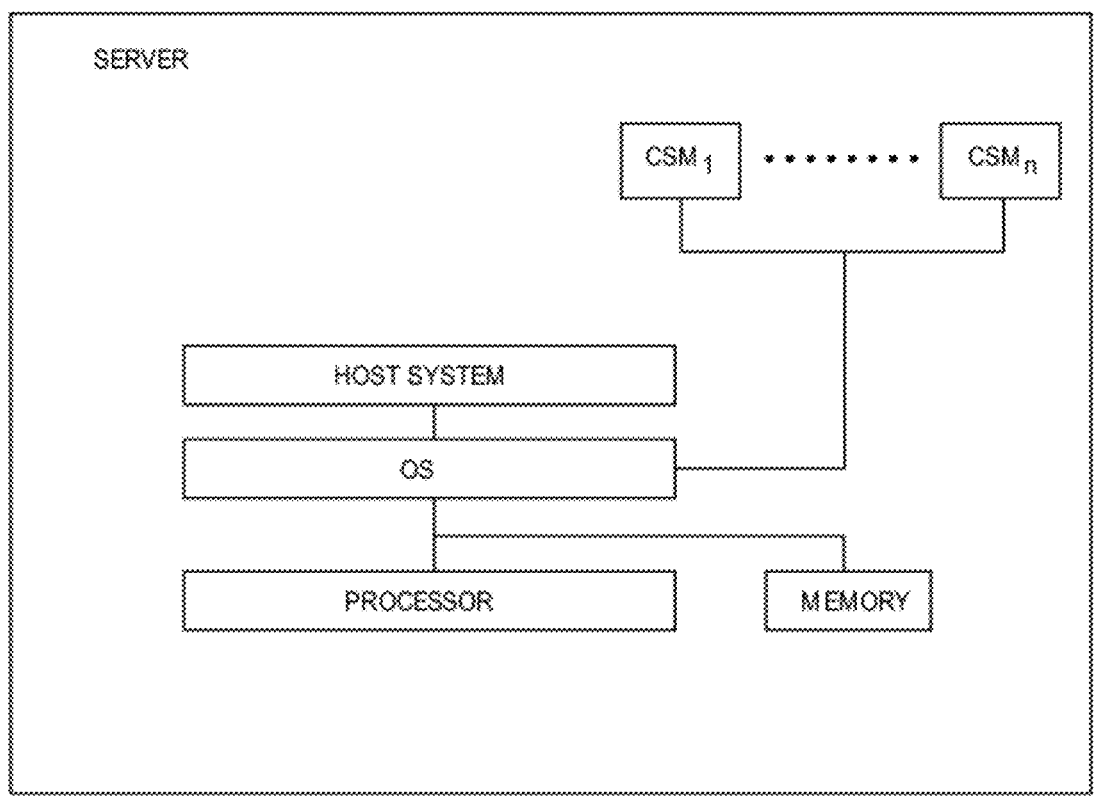
FIG. 5 illustrates an exemplary Query Software Module (QSM) that is consistent with the principles of the present invention.
Figure 6:
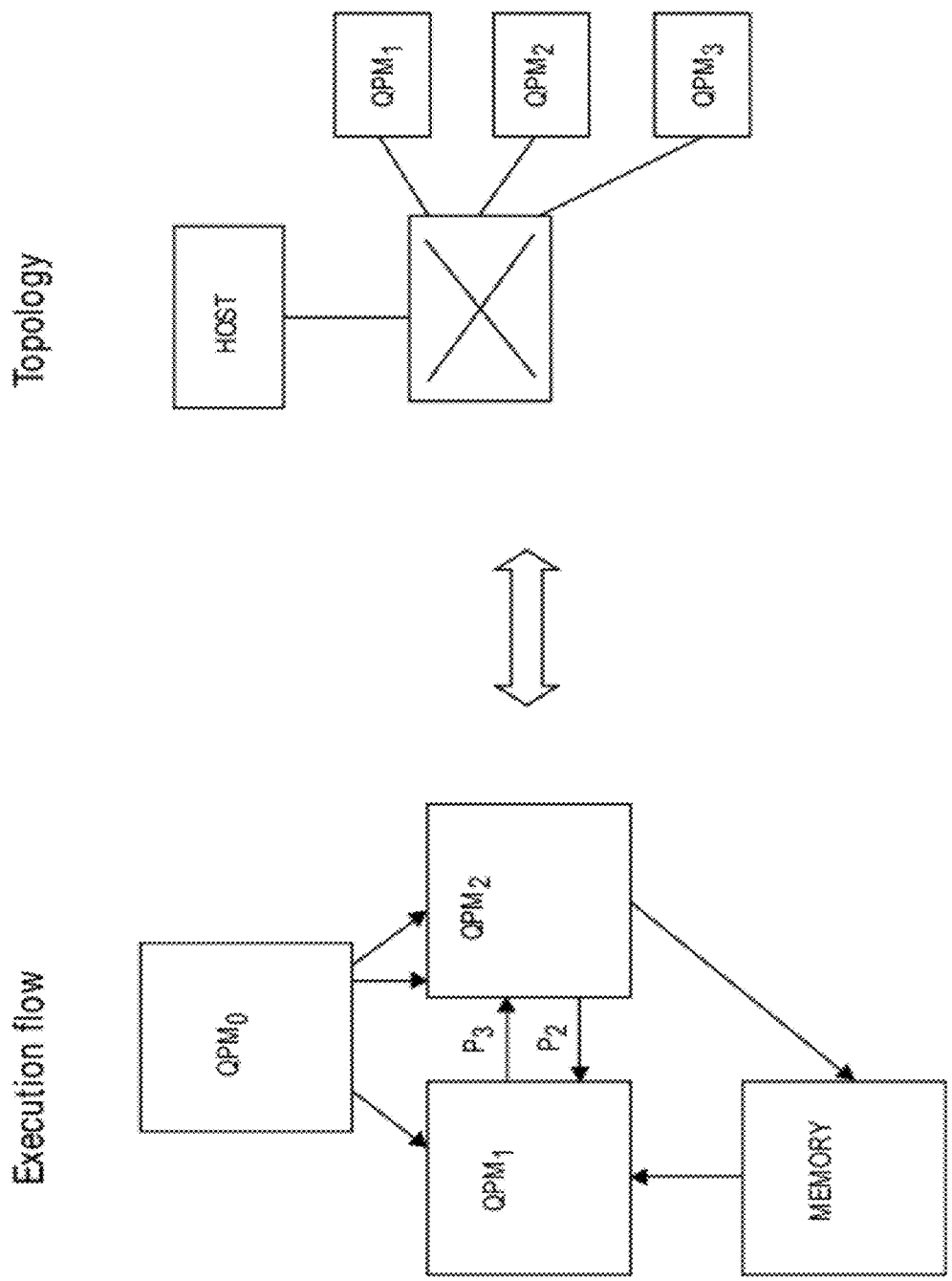
FIG. 6 conceptually illustrates how tasks for one or more queries may be processed by an embodiment of the present invention.
Figure 7:
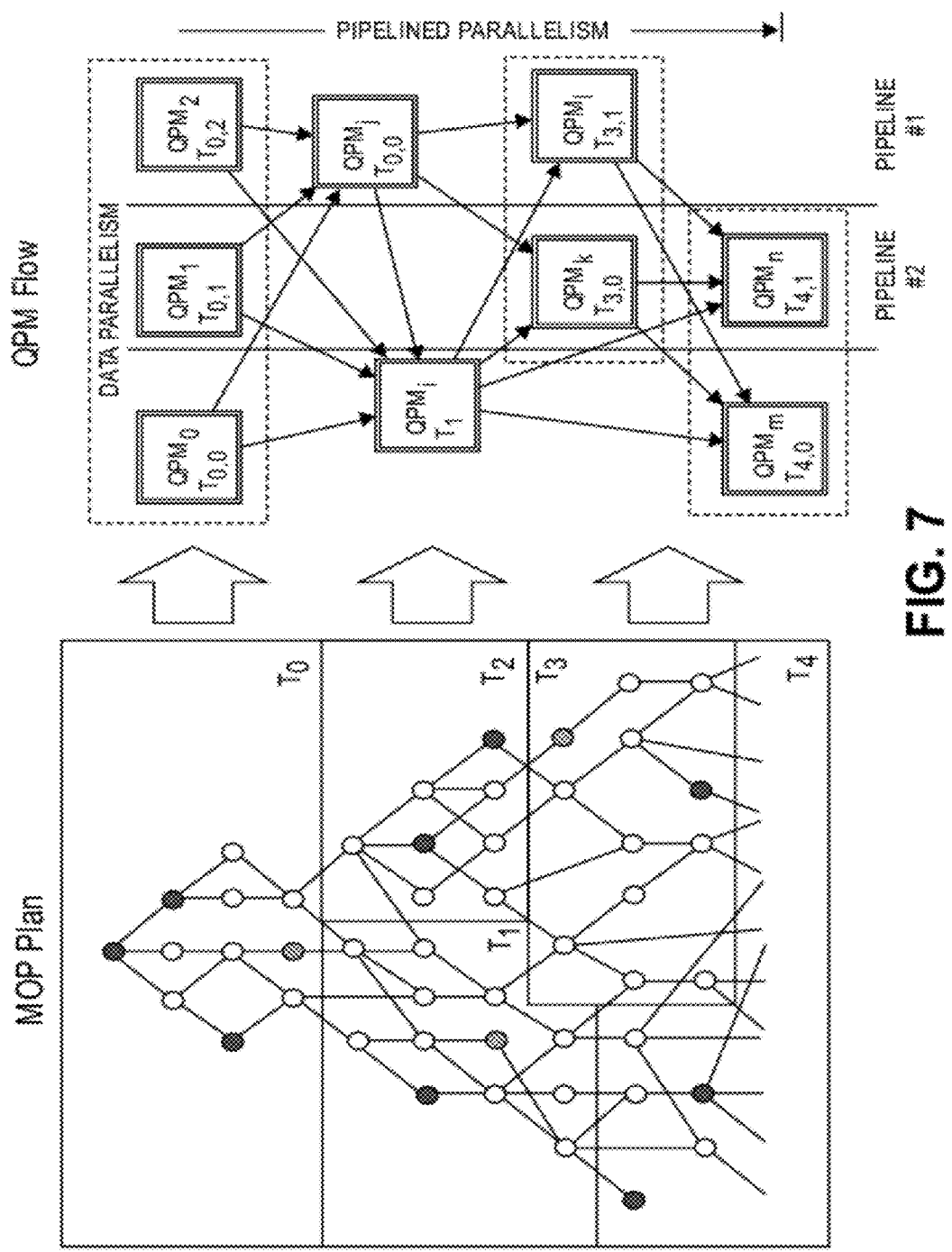
FIG. 7 illustrates an exemplary dataflow for a query by an embodiment of the present invention.
Figure 8:
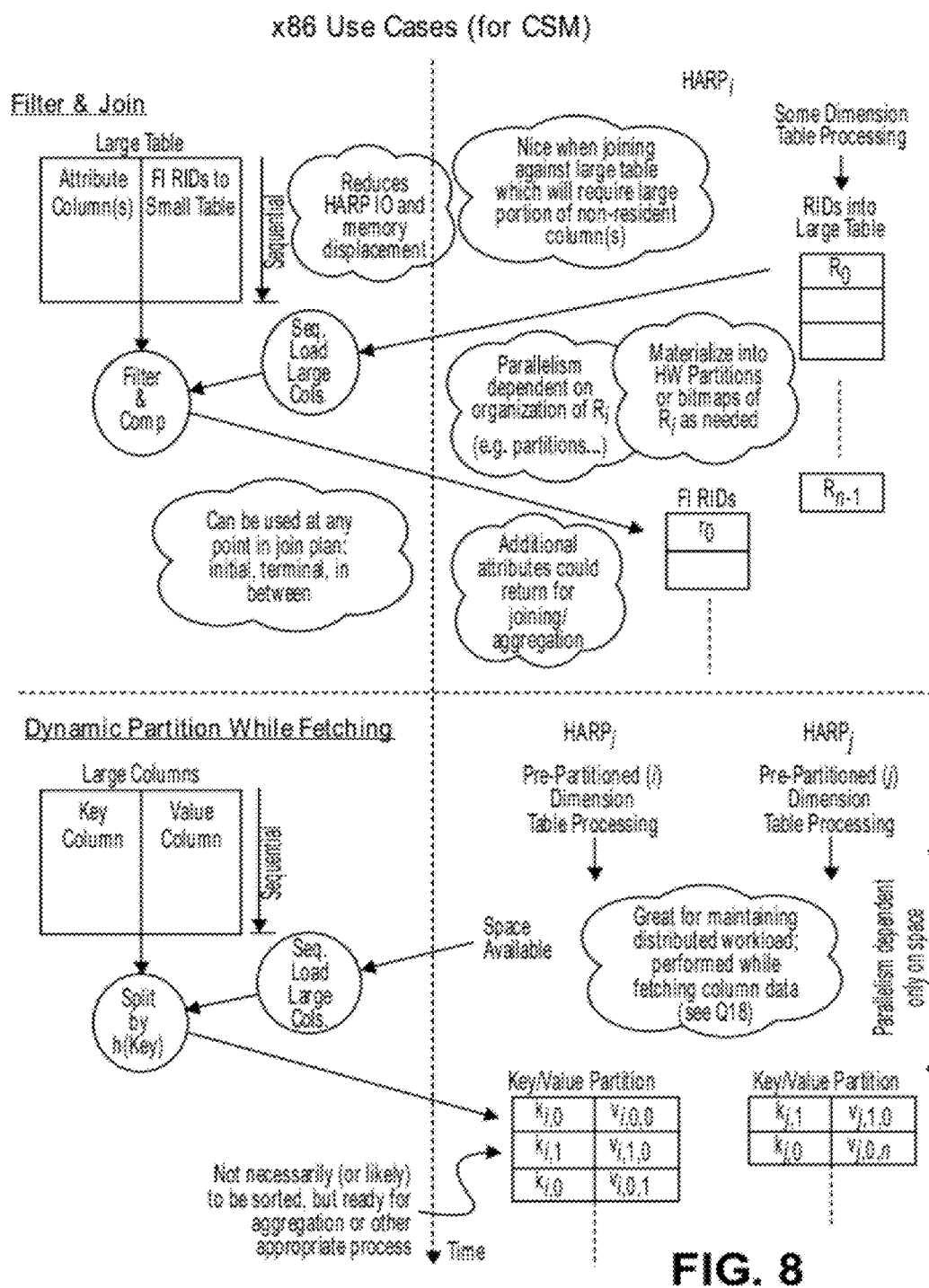
FIG. 8 illustrates exemplary use cases by an embodiment of the present invention.
Figure 9:
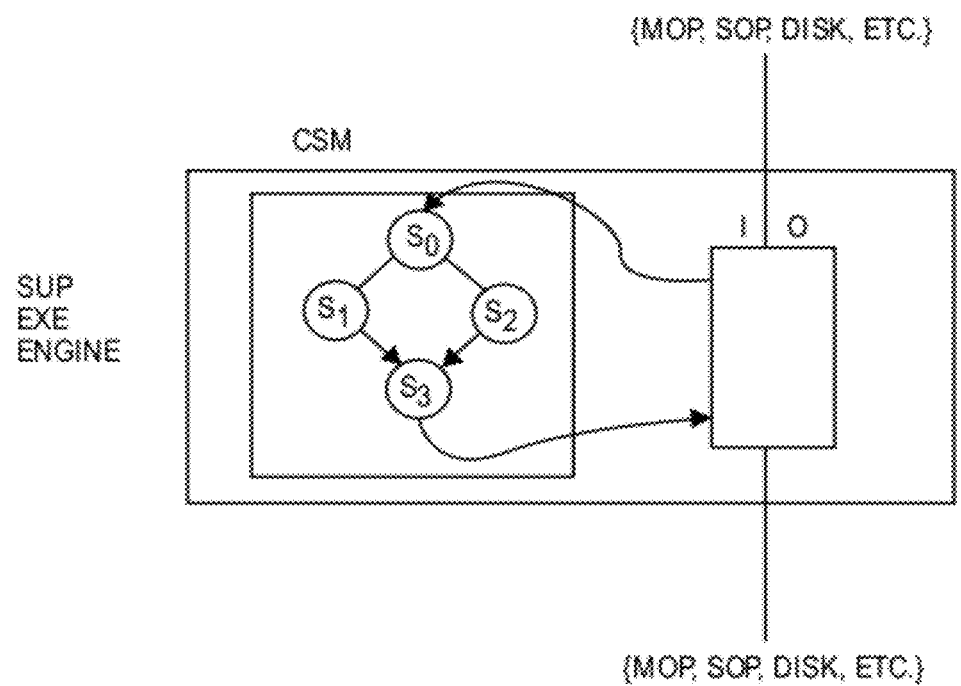
FIG. 9 illustrates an exemplary execution by a QSM and interface between the QSM and a MOP.
Figure 9:
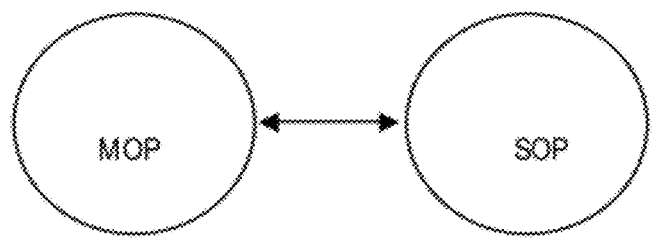

Due to the comprehensive nature of the present inventions in the C2 solution, the figures are presented generally from a high level of detail and progress to a low level of detail. For example, FIGS. 1, 2A, and 2B illustrate an exemplary system and exemplary system topologies. FIG. 3 illustrates an exemplary functional architecture. FIG. 4 illustrates an exemplary protocol stack. FIG. 5 illustrates an exemplary QSM. FIGS. 6-8 conceptually illustrates how tasks for one or more queries may be processed embodiments of the present invention.

Reference may now be made in detail to the exemplary embodiments of the invention, which are illustrated in the accompanying drawings. Wherever possible, the same reference numbers may be used throughout the drawings to refer to the same or like parts.

FIG. 1—An Exemplary C2 System

FIG. 1 illustrates an exemplary system 100 of the C2 solution. As shown, system 100 may comprise an application 102 that is running on a client 104, such as a personal computer or other system. Application 102 interfaces a set of DBMS nodes 106*a-n* across a network 108, such as the Internet, local area network, etc. DBMS nodes 106*a-n* may further interface one or more databases stored in storage infrastructures 112*a-n*, respectively. For purposes of explanation, DBMS nodes 106a-n and its components may be collectively referred to in this disclosure as a node of system 100. As shown, system 100 may comprise multiple nodes. The various components of FIG. 1 may now be further described.

Application 102 may be any computer software that requests the services of DBMS 106. Such applications are well known to those skilled in the art. For example, application 102 may be a web browser in which a user is submitting various search requests. Of course, application 102 may be another system or software that is consuming the services of nodes 106a-n and submitting queries to nodes 106a-n.

Client 104 represents the hardware and software that supports the execution of application 102. Such clients are well known to those skilled in the art. For example, client 104 may be a personal computer or another server.

Nodes 106a-n may be any set of devices, including hardware and software that assist in the processing of queries by system 100. In general, nodes 106a-n are configured to support various SQL queries on relational databases (and thus may also be known as a RDBMS). Typical examples of DBMSs supported by nodes 106a-n include Oracle, DB2, Microsoft Access, Microsoft SQL Server, PostgreSQL, and MySQL.

Network 108 represents the communication infrastructure that couples application 102 and DBMS 106. For example, network 108 may be the Internet. Of course, any network, such as a local area network, wide area network, etc., may be employed by the present invention.

Storage infrastructures 112a-n comprises the computer storage devices, such as disk arrays, tape libraries, and optical drives that serve as the storage for the databases of system 100. Storage infrastructures 112a-n may employ various architectures, such as a storage area network, network attached storage, etc., which are known to those skilled in the art.

In some embodiments, the C2 solution stores its databases in storage infrastructure 112a-n in column-store format. Column-store format is where data is stored in columns or groups of columns. Column-store format is advantageous for data fetching, scanning, searching, and data compression. The column-store format may employ fixed width columns and column groups with implicit RIDs and a RID to primary key column to allow for arithmetic memory addressing and translation. This allows system 100 to utilize hardware processing for database processing, such as column hopping, and to operate directly on the compressed data in the columns. Column store format is further described in the related applications, which are incorporated by reference.

Figure 2C:
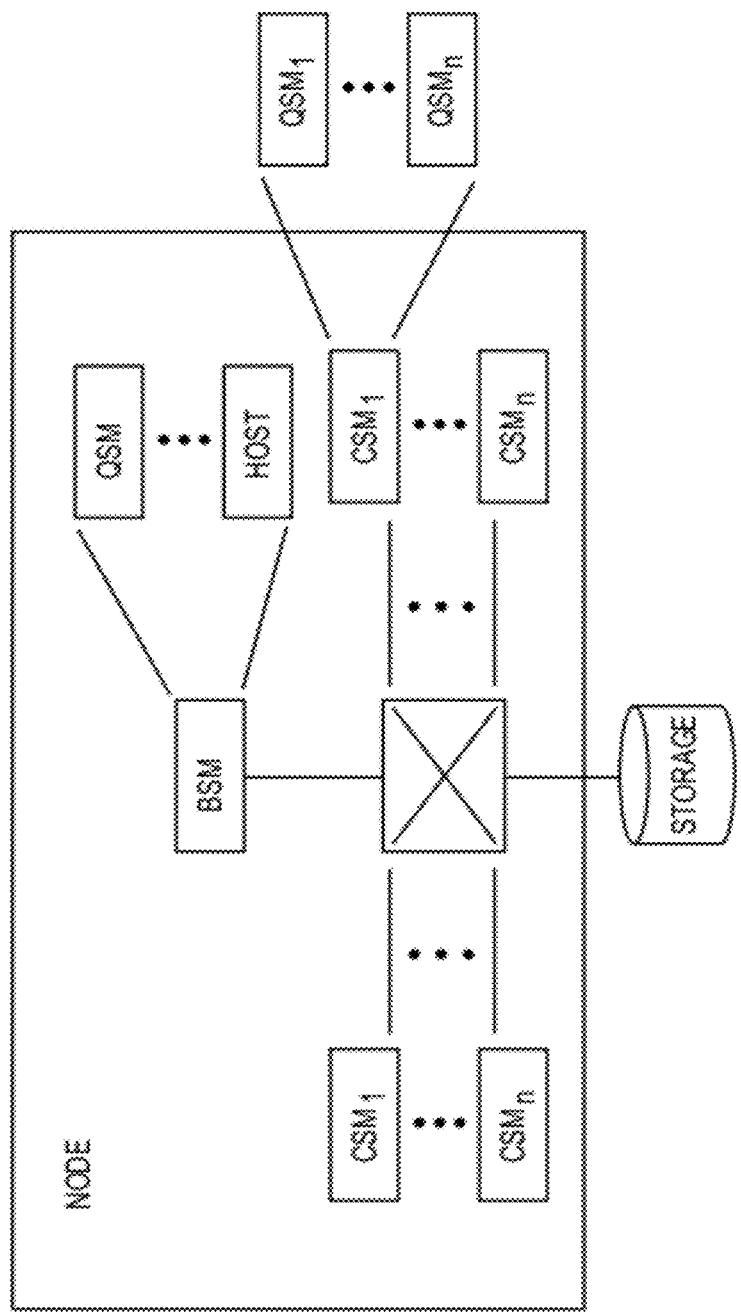

FIGS. 2A, 2B, and 2C—System Topologies

FIGS. 2A, 2B, and 2C illustrates exemplary node topologies. As shown, FIG. 2A illustrates a multi-QPM node topology. FIG. 2B shows a hybrid node that employs one or more QPMs as well as software based QSMs to assist in processing of queries. And FIG. 2C shows a node that employs a plurality of QSMs. These various topologies may be utilized to customize the C2 solution for various sizes of databases and desired performance. In addition, these topologies are provided to illustrate that the C2 solution can be easily scaled up to virtually any size of database or performance.

First, the multi-QPM node shown in FIG. 2A may be explained, which comprises a single host system (or BSM) 202 and multiple QPM modules 204a-n. The node 106b may comprise a BSM 202 and one or more QPM modules 204a-n. Collectively, host 202 and QPM modules 204a-n may be referred to as a node or appliance. In some embodiments, BSM 202 and QPM modules 204a-n are coupled together over a known communications interface, such as a PCIe or HyperTransport (HT) interface.

In terms of packaging, BSM 202 and QPM modules 204a-n may be built on one or more cards or blades that are bundled together in a common chassis or merely wired together.

The BSM 202 may comprise a general purpose CPU, such as a Xeon x86 processor by the Intel Corporation, and a memory, such as a dynamic random access memory. Such types of host systems are well known to those skilled in the art. In general, in the C2 solution, BSM 202 may be used to process parts of a query that are less time consuming (i.e., slow path portion), such as server-client connection, authentication, SQL parsing, logging, etc. However, in order to optimize performance, the bulk of query execution (i.e., the fast path portion) is offloaded to the QPM modules 204a-n.

BSM 202 may run MySQL software 114 and also run C2 software 110 that orchestrates query processing between MySQL 114 and QPM modules 204a-n. In particular, C2 software 110 may decompose a query into a set of query fragments. Each fragment comprises various tasks, which may have certain dependencies. C2 software 110 may determine which fragments and tasks are part of the fast path portion and offload them to one of the QPM module 204a-n. Appropriate tasks for the selected query fragments are sent to QPM modules 204a-n with information on the database operation dependency graph. Within the QPM modules 204a-n, tasks are further broken down into parallel/pipelined machine code operations (known as MOPs) and executed in hardware.

As described in the related applications, a QPM module 204 comprises processing logic and a relatively large memory for hardware accelerating database operations of the node. In some embodiments, QPM module 204 is configured to handle various repetitive database tasks, such as table scanning, indexing, etc. In the C2 solution, QPM modules 204a-n can receive high-level database query tasks (not just low-level read/write or primitive computation tasks as is typically for a general purpose processor) in the form of machine code database instructions.

QPM logic is the hardware that executes machine code database instructions for the database tasks being handled by a QPM module 204. To adapt to application requirement changes, the QPM logic is designed to have hardware reconfigurability. Accordingly, in some embodiments, the QPM logic is implemented using field programmable gate arrays (FPGAs). However, any type of custom integrated circuit, such as application specific integrated circuits (ASICs), may be implemented as QPM logic 302.

When it is implemented as a rigid ASIC, it is also possible to keep the reconfigurability of any one of QPM modules 204a-n by embedding FPGA cores in the ASIC (i.e., a mixed implementation). The reconfigurability of QPM modules 204a-n may have significance in allowing the C2 hardware platform to be "re-programmed" to adapt to changing application needs.

For example, a software patch or release may include a new FPGA image(s) that upgrade QPM modules 204a-n, in a manner similar to the way software or firmware can be upgraded. These new FPGA images may be downloaded by offlining the target QPM module to: fix functional bugs; add new features for functionality or better performance; or any other application/customer specific adaptation.

Multiple FPGA images could be stored in an Electrically Erasable Programmable Read Only Memory (EEPROM) or flash memory of the FPGA. Each FPGA image may then have its own unique functionality. One image could be used to speed up a fast loader (bulk) operation, which is normally done when there are no queries in the system (either parsed or offloaded). Another image could be used or loaded if an application requires a lot of text processing (structured, unstructured, or semi structured) and needs additional acceleration specific to text search, regular expressions, and other work/text related operations. Yet another image could be loaded for pattern matching queries related to DNA or protein search in bio-informatics applications. These FPGA images may be activated one at a time depending on customer application setup or dynamically loaded based on current active application workload.

The QPM memory serves as the memory of a QPM module 204. In order to maximize the efficiency of the QPM logic, the QPM memory 304 may be implemented using relatively large amounts of memory. For example, in some embodiments, the QPM memory in a QPM module 204 may comprise 256 Giga-Bytes or more of RAM or DRAM. Of course, even larger amounts of memory may be installed in QPM module 204.

In addition, in some embodiments, the QPM memory of various QPM modules 204 may be aggregated into a common pool of shared memory. Such aggregation may be accomplished based on having QPM modules 204a-n employ a common virtual address space.

FIG. 2B illustrates a hybrid node 106n. As shown, node 106 may comprise a single BSM 202, multiple QPM modules 204a-n, and one or more QSM modules 206a-n. In some embodiments, BSM 202, QPM modules 204a-n, and QSM modules 206a-n are coupled together over a known communications interface, such as a PCIe or HyperTransport (HT) interface.

As can be seen, hybrid node 106n differs from a multi-QPM node in that comprises QSM modules 206a-n. As noted, QSM modules 206a-n may be software-based modules that are coupled to hybrid node 106n. For example, legacy servers executing queries based on typical database software may be integrated into hybrid node 106n as a QSM. Of course, conventional servers executing DBMS software may be employed as a QSM. This architecture allows hybrid node 106n to handle various types of queries that are better suited for software rather than hardware acceleration.

FIG. 2C illustrates a multi-QSM node. As shown, the node may comprise a single BSM and multiple QSM modules. In some embodiments, these modules are coupled together over a known communications interface, such as a PCIe or Hyper-Transport (HT) interface.

As noted, QSM modules may be software-based modules that are coupled to the BSM. As will be recognized by those skilled in the art, any of the QSMs may be executing on the same underlying hardware platform or may be executing on different hardware platforms and coupled together via a communications interface. This architecture allows the multi-QSM node to handle various types of queries that are better suited for software rather than hardware acceleration while employing a clustered approach to these queries or tasks.

FIG. 3—C2 Software Architecture

As noted, C2 software 110 orchestrates the processing a query between MySQL software 114 and QPM module 204. In some embodiments, C2 software 110 runs as an application on BSM 202 and as a storage engine of MySQL software 114. As shown in FIG. 3, the QSM manager shares a control path with other QSMs. In addition, the QSM manager may share data with other QPMs, for example, via the crossbar with the other QPMs. For example, as further illustrated in FIG. 3A, data paths, e.g., shared flow, can occur among all the QSMs and QPMs. The control path used to send instructions and commands may utilize the same network of connections as the data paths. However, the control paths to a QSM or QPM may be independent or separate from the data path. (FIG. 4 also illustrates an architecture of the C2 software 110.) As shown, C2 software 110 comprises a query and plan manager 402, a query reduction/rewrite module 404, an optimizer 406, a post optimizer rewrite module 408, a query plan generator 410, a query execution engine (QEE) 412, a buffer manager 414, a task manager 416, a memory manager 418, a storage manager 420, an answer manager 422, an update manager 424, shared utilities 426, a QPM manager 428, and a QSM manager 430.

As also shown, BSM 202 is shown coupled to one or more QPM modules 204a-n and one or more CSM modules 206a-n. Each of the components of BSM 202 may now be briefly described.

Query and plan manager 402 analyzes and represents the parsed query received from the MySQL software 114, annotates the query, and provides an annotation graph representation of the query plan. Query reduction/rewrite module 404 breaks the query into query fragments and rewrites the query fragments into tasks. Rewrites may be needed for compressed domain rewrites and machine code database instruction operator rewrites. Optimizer 406 performs cost-based optimization to be done using cost model of resources available to C2 software 110, i.e., QPM module 204, resources of C2 software 110 itself using software operations, or MySQL software 114.

These modules interact with each other to determine how to execute a query, such as a SQL query from MySQL software 114. The data structures output by the query plan generator 410 may be the same data structure that the optimizer 406 and the rewrite module 404 may operate on. Once a parsed SQL query has been represented in this data structure (converted, for example, from MySQL), query and plan manager 402 rewrites the query such that each fragment of the query can be done entirely in MySQL software 114, in C2 software 110, or in QPM module 204. Once the final query representation is available, the rewrite module 404 goes through and breaks the graph into query fragments.

Post optimizer module 408 is an optional component that rewrites after the optimizer 406 for coalescing improvements found by optimizer 406. Query plan generator 410 generates an annotations-based, template-driven plan generation for the query tasks.

QEE 412 executes the query fragments that are to be handled by software or supervises the query execution in QPM module 204 via QPM manager 428. For example, the execution engine 412 handles faults from QPM. Transitions MOPs to SOPs if MOPs fail. Of note, one skilled in the art will recognize that this is but one approach. QSMs may be added in a hierarchical fashion, for example. In some embodiments, a QSM manager is provided within the host system or BSM 202 to manage a QSM. Of course, a QSM manager may be implemented as software running on a BSM. Accordingly, QSM can be remote from QEE 412. A MOP-SOP hybrid plan may be utilized when a query has: SQL functions; requires arithmetic precision; requires divide and arithmetic operations >64 bits; requires a large Order By limit. In some embodiments, a SOP task supersedes a MOP task within a originally formed DAG of tasks to optimize the SOP-MOP communication Buffer manager 414 manages the buffers of data held in the memory of host 202 and for the software execution tasks handled by host 202. Task manager 416 orchestrates the execution of all the tasks in QPM module 204 and C2 software execution engine 412.

Memory manager 416 manages the virtual address and physical address space employed by C2 software 110 and QPM module 204 in QPM memory 304. In some embodiments, memory manager 416 utilizes a 50 bit VA addressing (i.e., in excess of 1 petabyte). This allows C2 software 110 to globally address an entire database and optimize hardware execution of the query tasks.

Storage manager 420 is responsible for managing transfers of data from QPM memory 304 to/from storage infrastructure 112. Answer manager 422 is responsible for compiling the results of the query fragments and providing the result to MySQL software 114 via the API 116.

Update manager 424 is responsible for updating any data in the database stored in storage infrastructure 112. Shared utilities 426 provide various utilities for the components of C2 software 110. For example, these shared utilities may include a performance monitor, a metadata manager, an exception handler, a compression library, a logging and recovery manager, and a bulk/incremental loader.

In some embodiments, update manager 424 supports snapshot versioning is to support Query-While-Load operations. In snapshot versioning, logically each row has creation/deletion timestamp. This timestamp can be represented as using a snapshot version number ("svn"). An "UPDATE" operation is atomically converted into DELETE followed by INSERT. The creation timestamp can now be replaced by watermark per svn. "VALID" bitmap vectors are then created for each table, for example, CSV0 . . . . CSVn (Committed Snapshot Vector at svn=0 . . . n), indicates valid rows at the specific svn #. One CSV is specified per each active svn # and reclaimed when SVN is no longer in use.

An Uncommitted Latest Vector for m open transactions (ULV0 . . . ULVm) may be used to indicate valid rows of uncommitted data that is in the middle of open transaction. In order to transition ULV to latest CSVx, the CSVx eventually becomes CSVn at snapshot refresh/creation.

For a snapshot refresh, update manager 424 may convert a Change Log into a set of IUD list, where the array entry is: Table, Col, RID#, Value. Update manager 424 may also employ a scattered write MOP to allow fast random write when applying mixed IUD list. The following figures illustrate variations of snapshot versioning supported by the embodiments.

QPM manager 428 controls execution of the tasks in QPM module 204 by setting up the machine code database instructions and handles all interrupts from any of the hardware in QPM module 204. In some embodiments, QPM manager 428 employs a function library known as a Hardware Acceleration Function Library (HAFL) in order to make its function calls to QPM module 204.

QSM manager 430 controls execution of the tasks in a CSM module 206 by interfacing with the software executing on CSM module 206. In some embodiments, CSM manager 430 employs an API or library in order to make its function calls to CSM module 206.

FIG. 4—System Software Stack of C2 Software and Hardware

As shown, a SQL query is received in the RDBMS layer, i.e., MySQL software 114. MySQL software 114 then passes the SQL query via API 116 to C2 software 110. In C2 software 110, the SQL query is processed. At this layer, C2 software 110 also manages retrieving data for the SQL query, if necessary, from storage infrastructure 112, from BSM 202, or from CSM modules 206a-n.

In order to communicate with QPM modules 204a-n, QPM manager 428 employs the HAFL layer in order to make its function calls to QPM modules 204a-n. In order to allow for variances in hardware that may exist in QPM module 204, the system software stack may also comprise a hardware abstraction layer (HAL). Information is then passed from C2 software 110 to QPM modules 204a-n in the form of machine code database instructions via an interconnect layer. As noted, this interconnect layer may be in accordance with the well-known PCIe or HT standards.

Within QPM modules 204a-n, the machine code database instructions are parsed and forwarded to its QPM logic. These instructions may relate to a variety of tasks and operations. For example, as shown, the system software stack provides for systems management, task coordination, and direct memory access to QPM memory.

As shown, in the QPM logic, machine code database instructions are interpreted for the various types of processing elements (PE). QPM logic may interface with QPM memory, i.e., direct memory access by utilizing the memory management layer. Further details about QPM logic may be found in the related applications, which are incorporated by reference.

FIG. 5—Computer Software Module

Referring now to FIG. 5, an exemplary Query Software Module (QSM) is shown that is consistent with the principles of the present invention. As noted, a QSM may comprise a general purpose CPU, such as a Xeon x86 processor by the Intel Corporation, and a memory, such as a dynamic random access memory. Such types of software-based systems or servers are well known to those skilled in the art. In general, in the C2 solution, a QSM may be used to process parts of a query (accomplished by SOPs) that are more time consuming (i.e., slow path portion) or more complex in nature, such as server-client connection, authentication, SQL parsing, logging, etc. However, in order to optimize performance, a QSM may operate in conjunction with QPM modules 204a-n.

For example, in some embodiments, a QSM may run MySQL software and interface C2 software 110 in the BSM 202. In particular, C2 software 110 may decompose a query into a set of query fragments. Each fragment comprises various tasks, which may have certain dependencies. C2 software 110 may determine which fragments and tasks offloaded to one of the QPM module 204a-n or the QSM. Appropriate tasks for the selected query fragments are sent to the QSM with information on the database operation dependency graph. Within the QSM, tasks may be further broken down into operations. Since these operations are executed with software predominantly, the present disclosure may refer to them as SOPs.

FIG. 7—MOP Parallelism

FIG. 7 illustrates a typical MOP plan and how it may be partitioned and mapped to multiple QPMs for parallel execution. Each node in the shown MOP plan represents a MOP, or a sub-graph of multiple MOPs. Each directed edge of the graph represents at least one flow of execution data from the producer node to at least one consumer node. Without a loss of generality, one skilled in the art will understand that a "node" may be a MOP, a collection of MOPs, a subtree of the DAG, and the like.

As shown, the MOP plan has been split into tasks: T0, T1, . . . T4, each of which may be optimized to meet the execution resource limitations of a single QPM. This enables fully parallel execution when scheduled to run simultaneously across multiple QPMs.

The QPMs may be connected via a network interconnect allowing any QPM to share its execution flows with at least one other QPM, in a dynamically configurable manner. This feature facilitates the flow transfer of the original MOP plan, for example, between tasks T0 and T1, T0 and T2, T1 and T4, and so on.

In some embodiments, as a matter of QPM storage efficiency, a given MOP task may be data partitioned to execute what is effectively the same operations on distinct portions of at least one large data source. This form of partitioning is illustrated, for example, where task T0 is "replicated" as T(0,0), T(0,1), and T(0,2), across QPMs: Q0, Q1, and Q2, respectively. This partitioning may be performed in order to fulfill the execution requirements of T0 across distinct portions of data (e.g, a SPMF).

Lastly, FIG. 7 illustrates pipelined parallelism in executing simultaneously across multiple QPMs. In such parallelism, the nodes may cooperate according to producer-consumer relationships established by the data flows. That is, each consumer node receives and processes its input(s) as the data arrives from its associated producer node(s). This chaining forms a pipeline, which can maintain a high execution throughput rate. This feature is exemplified in FIG. 7, for example, by the data flows from QPMs Q0, Q1, and Q2 to QPM Qi, where T1 executes, and to QPM Qj, where T2 executes, which have been established both to fulfill the (functional) MOP plan data flow requirements, and to establish a pipeline through which producers and consumers may work simultaneously.

In one embodiment, the present invention is integrated with existing, conventional row-store technologies. The figure below illustrates a high level block diagram of an exemplary integrated system stack. The blue components represent a conventional row-store RDBMS software and primary database storage. The green components are QSM software (physical stack) and hardware components (QPM and SSD) that sit underneath the RDBMS layer. From users and application point of view, this integrated stack is transparent and backward compatible.

To simplify the design, the embodiments of the present invention may utilize cached data while the RDBMS continues to own the primary data. The cached data is organized in compressed column-store format to take full performance advantage of the QPM and dataflow execution. The cached data could be the current hot and warm columns of active database(s). Cold columns can usually reside in disk storage of the RDBMS.

Row store-to-column store format conversion may be accelerated using a MOP that is augmented with "RS-to-CS transpose" capability to support this acceleration. The column-store cache can behave like a real cache to the RDBMS row-store database. It is able to dynamically hold current active workload (hot+warm columns) at a given period.

One or more of the QPMs may maintain information on which columns are present in the cache. If necessary, the RDBMS can access this information to determine which Query Fragments (QFs) to accelerate in the QPMs. This does not preclude any of the QPMs to execute against columns that do not currently exist in the cache. The embodiments also have flexibility in the design to determine which columns to cache. For example, the RDBMS can give hints to QPMs on which columns need to be cached. The QPMs can learn from RDBMS schema/metadata to determine which columns are likely hot/warm (e.g., DATE columns).

QPMs may learn dynamically overtime on which columns are used frequently (hot) or semi-frequently (warm) based on the QFs sent. For example, a "column usage count" can be used in the QPM cache victimization algorithm. So as long as a column is of the data type that a QPM can convert and execute, a QF's workset columns may have cold column(s) that the QPM may fetch on demand into the CS cache. In some embodiments, the CS cache content may dynamically adjust as the active workload shifts overtime.

Typically, the CS cache may be first populated when the RDBMS's RS database is initially bulk loaded. As there are incremental bulk loads, the QPM CS may also be updated by calling the appropriate API functions. On DML trickle updates and crash recovery, the RDBMS may automatically maintain CS cache coherency by logging all committed transactions (not rollbacked) into an asynchronous change list (ACL), which are subsequently updated into CS cache.

During QF execution, the QPMs may take care to fetch the missing columns into CS cache. With pipelined execution, QPMs may bring chunks (RID ranges) of the missing column to hide some of the I/O latency. Given the hardware accelerated RS-to-CS conversion, the conversion bandwidth is estimated to be better than disk I/O bandwidth, thus not becoming the bottleneck.

To improve CS cache efficiency, the RDBMS can tag a QF column as "do not cache" as they are of intermediate result or "forever cold" column type. In summary, a QPM can always execute any QF irrespective of current cache content, but, by providing proper cache hints, performance can be very efficient.

Figure 16:
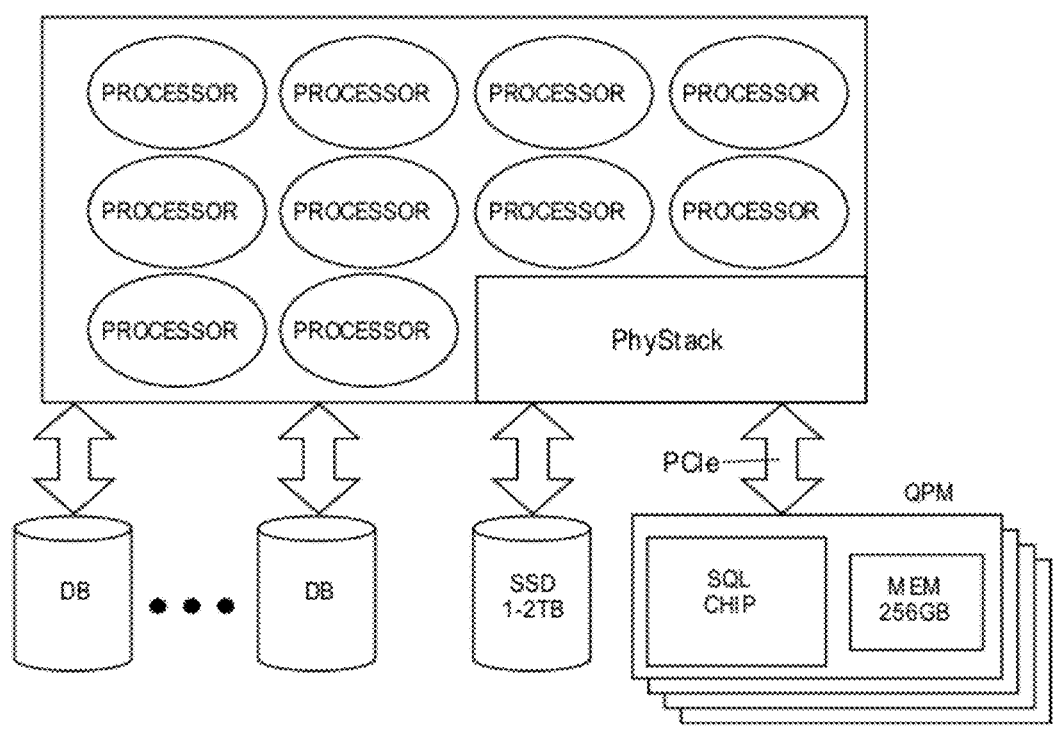
FIG. 16 illustrates yet another exemplary architecture for integrating embodiments of the present invention with a database management system.
Figure 17:
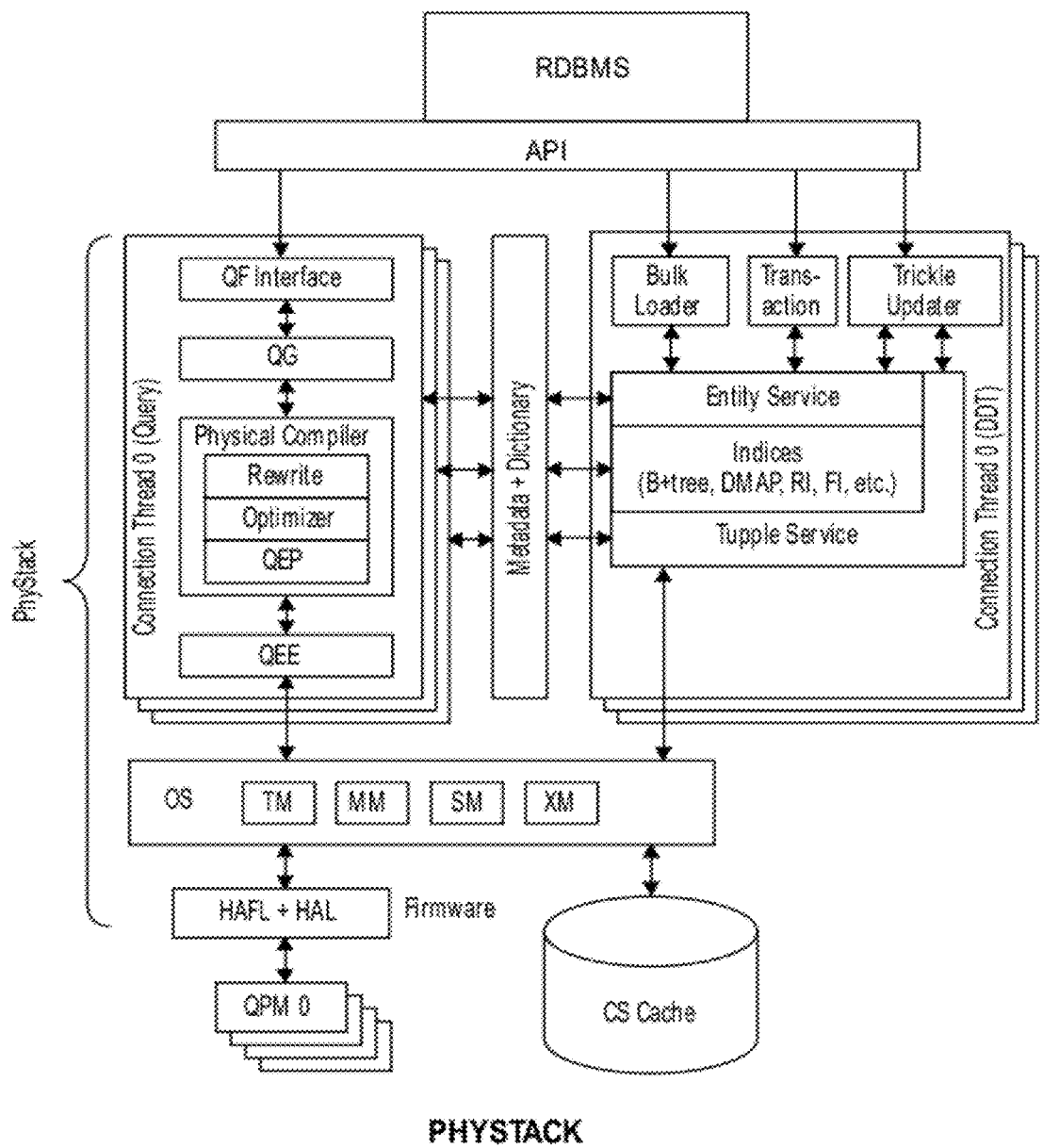
FIG. 17 illustrates further details of a PHYSTACK used by embodiments of the present invention.

FIG. 16 illustrates a RDBMS node accelerated based on the embodiments, which includes one or more QPMs and a SSD array. These hardware components may connect through standard PCI Express (PCIe) interface. Each QPM may comprise a dataflow SQL chip and a memory (such as 256 GB). Multiple processors may share the same accelerator.

To interface, a software library "PhyStack" runs as a set of threads with callable functions. The internals of this physical stack are described further below.

The PhyStack comprises four primary components: query fragment (QF) processing, load/update/transaction processing, platform operating system, and firmware. On the query processing, the RDBMS sends a QF to be executed in the accelerator based on query operation cost and types. A QF contains one or more SQL operations, structured in a dataflow graph. The second component handles bulk loading (initial load, incremental insert/delete/update), trickle updates from DML, and transaction-related operations.

The third component handles operating system functions, such as query/prefetch task scheduling, QPM memory management, SSD storage management, and data transfer manager to/from QPM memory. The fourth component provides hardware abstraction, DMA/PCIe drivers, interrupt handler, and diagnostics of QPM.

In some embodiments, there are different options of integrating query execution into the RDBMS. For example, the RDBMS optimizer can be made aware of the QPM and the associated cost models. This can be done in a modular way such that the optimizer is not to be exposed to the internal details of the QPM execution. The QPM cost models can be exposed to the optimizer allowing it to cost the operations in its regular join enumeration algorithm.

In general, a SQL query statement goes through parsing and logical rewrite/optimization steps in the RDBMS layer. The query plan is then executed in multiple virtual processors, which subsequently pass the query plan to be executed in the accelerator, i.e., using a QPM or QSM. In a conventional RDBMS implementation, this query plan is a single operation (e.g., scan, join, etc.) at a time.

Ideally, for efficiency, this query plan would consist of more operations in the QF dataflow graph. The QF API should allow specifying all the dataflow operators and building the dataflow graph by specifying the connections in the graph. The API can be defined in various ways, from passing the parsed (and annotated) query tree object directly, using dataflow query language to using a C++ programmatic interface.

The following examples show the proposed QF APIs for submitting a QF and for sending QF results. In addition, there may be API calls defined for the RDBMS optimizer to get some cost functions.

```
// Base class to create expressions
class kf_expression
{
    Vector<kf_expression*> m_vChildExprs;
};
// Subclasses of Expression class to specify different expressions
class kf_arithExpression: public kf_expression { };
class kf_compExpression: public kf_expression { };
...
// Base class to specify a dataflow operator
class kf_dataflow_op
{
    setInputFlow(kf_dataflow_op* inputDF);
    setProjections(vector<kf_expression*>& projectionExprs);
    Vector<kf_dataflow_op*> m_vInputOps;
};
// Subclasses to specify different dataflow operations
class kf_dataflow_scan: public kf_dataflow_op
{
    kf_dataflow_scan(string table_name);
    setInputTable(string table_name);
};
class kf_dataflow_filter: public kf_dataflow_op
{
    setFilterExpression( kf_compExpression* filterExpr);
};
class kf_dataflow_groupby: public kf_dataflow_op
{
    setGroupByKey(vector<kf_expression*>& gbKeyExprs);
    setAggregateExprs(vector<kf_expression*>& aggExprs);
};
...
```

Usage Example
SQL Query:

```
SELECT
    p_container,
    sum(l_extendedprice*(1−l_discount)) AS revenue
FROM
    lineitem,
    part
WHERE
    l_partkey = p_partkey AND
    p_size between 1 and 5 AND
    p_brand = 'Brand#12'
GROUP BY
    p_container
```

Logical DataFlow:
r1=FILTER part BY (p_size between 1 and 5)
r2=FILTER r1 BY (p_brand='Brand#12')
r3=JOIN lineitem BY l_partkey, r2 by p_partkey
r4=GROUP r3 BY p_container
r5=FOREACH r4 GENERATE p_container, SUM(l_extendedprice*(1−l_discount))
Dataflow Programmed Using the API:

```
kf_dataflow_scan *r0 = new kf_dataflow_scan("part");
// Construct expression for p_size between 1 and 5
kf_compExpression *psizeEx = new kf_compExpression( );
kf_dataflow_filter *r1 = new kf_dataflowfilter( );
r1->setInputFlow(r0);
r1->setFilterExpression(psizeEx);
// Construct expression for p_brand = 'Brand#12'
kf_compExpression *pbrandEx = new kf_compExpression( );
kf_dataflow_filter *r2 = new kf_dataflow_filter( );
r2->setInputFlow(r1);
r2->setFilterExpression(pbrandEx);
//Construct expression for join with lineitem.
kf_compExpression *pjoinEx = new kf_compExpression( );
kf_dataflow_join *r3 = new kf_dataflow_join( );
r3->setInputFlow(r2);
r3->setInputTable("lineitem");
r3->setJoinExpression(pjoinEx);
// Similarly program the remaining operators
kf_dataflow_groupby *r4 = new kf_dataflow_groupby( );
r4->setInputFlow(r3);
r4->setGroupbyKey( );
r4->setAggregateExprs( );
```

This QF is given to the accelerator to execute and eventually produce the QF result set.

Sending Results

There are two ways a virtual processor is able to obtain results from the accelerator. The results can be pulled by a processor or pushed to the processor by invoking a callback. A callback may be a general-purpose abstraction for result retrieval.

```
// Base class that holds the values for all datatypes.
Class kf_field { };
Class kf_field_integer: public kf_field { };
Class kf_field_decimal: public kf_field { };
Class kf_field_string: public kf_field { };
Class kf_resultSet
{
    send_result_row( );
};
```

During initialization/startup, the RDBMS may pass initial DDL information to accelerator for all tables and column info to be cached. The RDBMS can invoke a DDL APIs when tables are created, dropped or modified. DDL drivers for the accelerator may set up The accelerator Metadata appropriately.

DDL drivers are passed one of the above descriptors along with some high level description of the operation. The accelerator may provide some DDL level wrapper APIs that may be able to take inputs from the RDBMS and internally form the descriptors and execute the DDL operations.

As users issue bulk loading commands (initial or incremental) to the RDBMS system, the bulk loading is done first at the RDBMS RS side, and subsequently updated to the CS cache side in a pipelined fashion. To reduce the x86 CPU and memory resource contention, CS cache load execution can be mostly offloaded/accelerated in QPM.

Below are some examples of bulk load API functions:

```
kf_load_handle kf_load_begin(load_type, table,
        [ input_desc ]+,
            [ col_binding ]+,
        ...// other misc flags etc
        );
ret_code_t kf_load_next(load_handle,
            [ (buffer, size) ]+ );
// one (buffer, size) tuple for each input_desc.
// zero or more _next calls to send data to kfdb.
ret_code_t kf_load_end( load_handle, end_type );
load_type: { INITIAL, BULK_INSERT, BULK_UPDATE,
BULK_DELETE, BULK_POPULATE }.
    BULK_POPULATE: is to re-populate for data that had been
    evicted from CS (e.g., base column was evicted but not its related
    hot index column, or a new column RID range of existing column is
    added to CS cache)
end_type: { SUCCESS, ABORT }
```

-continued input_desc: each describes the format of a row major buffer to be passed
   in. A special input_desc can be used to for a buffer providing
   ranges of RIDs, which may be applicable with BULK_DELETE,
   BULK_UPDATE, or BULK_POPULATE.
col_binding: each specifies one column of the table to be loaded plus
   its "position" in the input_desc's.
      BULK_DELETE/BULK_UPDATE would expect a special column
      binding corresponding to the RIDs to delete or update.

Trickle updates from DML operation (mix of insert/update/delete) are usually non-batchable, unlike the bulk loading operation. As these trickle updates are committed and logged into RDBMS's recovery/change log, it may call an API to update the accelerator's Asynchronous Change Log (ACL), which is persisted in SSD. The accelerator may filter the ACL to gradually apply only appropriate cached column data into CS cache. If subsequent QF is submitted which requires updated data from the ACL, the corresponding change(s) may be applied prior to execution.

For transaction processing, the RDBMS coordinates a commit to the ACL before concluding its commit. In this way, the accelerator can be oblivious to uncommitted transactions (rollbacks). Given that a CS cache only consists of committed data, queries involving uncommitted data need to be executed on the RDBMS side.

With respect to concurrent operations, the RDBMS can be used to resolve all read/write locks prior to issuing a QF to the accelerator. Therefore, the accelerator can assume all issued operations can be executed concurrently once the ACL dependency has been resolved.

The CS cache of accelerator is generally in sync transactionally. The cache content may not be transactionally latest since it still needs to be merged with entries in the ACL. Between the ACL and the cache, the accelerator may contain all committed data. Any queries executed may reflect all changes in the ACL. All dependent ACL updates prior to a QF's timepoint (the RDBMS arrival timestamp) are pushed to CS Cache prior to the QF execution. Queries that don't depend on outstanding ACL entries can be executed immediately. Each ACL entry has timestamp relative to RDBMS side. In general, the ACL is drained quickly so there is no impact to QF execution.

During crash recovery, the RDBMS may go through its recovery process independently and update the accelerator on the resolution of any "in-doubt" transactions. The accelerator may subsequently adjust its ACL appropriately. Eventually all committed transactions in this ACL may be applied to the CS cache. The accelerator does not need to directly participate in the RDBMS's UNDO/REDO recovery process.

Within a RDBMS node, both the RDBMS and the accelerator software stacks run on the same x86 server. The accelerator software may employ a bulk memory pool allocation/deallocation. This feature can be interfaced with RDBMS's memory management API.

As noted, the accelerator can efficiently support the transposition of row store data into its native column store form. This operation lends itself naturally to a sequence of pipelined-parallel processes and is thus dataflow friendly, which makes it a good candidate for QPM processing support. Assuming some hardware (MOP) enhancements, the QPM can be utilized to offload the transposition operation, thus accelerating the availability of new data.

As illustrated, the transposition flow begins with the process of identification, which involves locating the columns of interest and their boundaries within each row record. The accelerator's software stack can be used to perform this step to parse row store structure efficiently. Later, QPM can be leveraged to further improve performance of this step and reduce the load on the x86 processor.

Once columns have been located, slicing is the process of extricating and separating the columns into discrete flows. Each column slice flows in pipelined fashion, independent of other columns, where pipeline order retains correlation with the input row order.

Compression is then applied over each column slice, according to index lookups and arithmetic transformations appropriate for each individual column. The optimal type of compression would already have been determined. Lastly, the process of Packing coalesces the elements of each independent column pipeline together into the accelerator's dense column store format.

If the load is incremental, the column data (column fragment) is written into an existing column. If the load is uncommitted, the column fragment can be stored separately and combined with the committed column on the fly. As needed, committed columns can be sent to SSD.

With only incremental enhancements, this flow can be implemented using existing QPM MOPs. In general, the transposition operation is expected to be very efficient.

In some embodiment, the accelerator system stack can be managed as a sub-component in the RDBMS RAS architecture (like local RAID or server memory management). The accelerator RAS manager may report RAS events to the RDBMS RAS manager. Responsibility for responding to QPM events would exist with the accelerator RAS manager to enable rapid recovery of local events. General system server management responsibility would remain with the RDBMS RAS manager.

A highly reliable and serviceable system may be maintained through the following features:
   ECC protected QPM DIMM
   Robust PCIe communications
   Protected internal QPM and SQL Chip communications
   RAID configured SSD (if needed)
   N+1 Hot swappable fans
   N+1 Hot swappable PSUs (power supply units) in PSM (power supply module)
   Active QPM/PSM monitoring (temperature, fans, voltage, data integrity, . . . )
   Fault tolerant DIMM system (if needed, mask and continue)

In some embodiments, RDBMS (TD) data changes from DMLs to are synced to the accelerator (KF) CS cache. First, ACL entry, called Data Change Record, is discussed. Then, the different operations involving the ACL to keep the cache and QF coherent are discussed.

The data change records describe the changes that are made by DMLs to the TD database. The following is an exemplary format of a DCR:
TransactionId, Operation, [Key/RID], [Data]
   TransactionId: The unique id of the transaction. This can be the same as the TD txn id. This may be used for correlating all changes belonging to a transaction.
   Operation: Describes the type of DML: Insert/Update/Delete
      Insert:
         key/RID is not specified. Data contains an array of values. Column Id is not specified.
      Update:
         Data specifies the Column Id and the corresponding data to update Delete:
Data is not specified. Key/RID uniquely identifies the row to be deleted.
In addition to DML operations, Operation field can be Commit or Rollback.
Key: Single or composite key. The key is used to identify the exact row being updated. Key can be replaced by RID if a universal RID numbering is consistent across TD RS and KF CS side.
Data: Column Id and its value An Asynchronous change log is a persistent staging area that is used for temporarily holding the data change records generated. A Sync thread is a background thread that reads DCRs and syncs the changes onto KF CS Cache. However, data from ACL can be synced on demand when a QF is submitted for execution. The accelerator's internal locks are held by KF Sync thread when data changes are written to the KF cache. This process is similar to a DML being performed on the accelerator database.

In some embodiments, only committed transactions are synced to the cache. While processing the DCRs, if a rollback record is encountered, all DCRs corresponding to the transaction are skipped. DCRs can be generated from the following sources within TD:

DMLs—DCRs are written to ACL in same txn as that of the DML (synchronous). This approach is simpler to implement and may be discussed in this document.

Transaction Logs (not discussed as a part of this doc)—DCRs are mined from the transaction log and processed asynchronously In the first phase, there may be one Sync thread, but the system can be enhanced to have multiple Sync threads syncing changes from ACL in parallel after dependencies are resolved.

DCRs are generated while the DML is in progress after the keys (or RIDs) have been resolved. DCRs are written to ACL as a part of the DML operation on TD. There are multiple options to implement it. For example, DCRs can be written to ACL as and when they are formed during DML execution. A Commit or rollback record is written to the ACL when TD transaction commits or rolls back respectively. This may result in DCRs of different transactions being interleaved in the ACL.

DCRs can be buffered for the entire transaction and written to ACL only when the transaction is committed. For rolled back transactions, the buffered DCRs can be discarded. Alternatively, a hybrid approach may be to buffer certain number of DCRs and then write them all to ACL. A commit or rollback record is written when TD transaction commits or rollsback respectively.

A TD may write DCRs for the hot and warm columns. Cold column changes are not tracked by KF CS Cache. Filtering of cold column DCRs can be either performed by TD during DMLs or by Sync thread during syncing.

When a QF is submitted to the cache, all DCRs for the table(s) affected by the QF may need to be synched before the QF can be executed on KF CS cache. Logically, this is done by synching all DCRs that have committed before the QF is submitted, as determined by the DML/QF's timepoint.

Unrelated tables can continue to be synced by a Sync thread concurrently while a query fragment is being executed. For example, if the ACL contains the following DCRs for tables A, B, C and D:

DCR A1 (table A) Txn 1
DCR A2 (table A) Txn 1
Commit Txn 1
DCR B2 (table B) Txn 2
Commit Txn 2
DCR C2 (table C) Txn 3
Rollback Txn 3
DCR D1 (table D) Txn 4
DCR D2 (table D) Txn 4
Commit Txn 4

DCR A1 arrived first and DCR D2 arrived last. Now, a QF that depends on table B is received. At this time, all DCRs up to Txn 2 are required to by synced before the query can be executed. Opportunistically DCRs from Txn 3 onwards can be synced by the Sync thread because they don't conflict with outstanding QFs. Note that transaction 3 may be skipped by KF Sync thread as it's a "rolled back transaction". While not shown in the example above, DCRs of different transactions may be interleaved in the ACL due to concurrent execution.

The accelerator can maintain a 'temperature' of the columns based on the usage pattern. Hot and warm columns are kept in the KF CS Cache (QPM+SSD). Columns that are present in the KF CS Cache are synced through the ACL. Cold columns can be read from TD on demand during prefetching phase of KF query execution. Data from TD row store is transformed into columnar data and brought into KF cache on demand. In the embodiments, there are different options for integration as the query moves down the stack of the database kernel. For example, these options may include: an unoptimized Parse Tree; an optimized Query Graph (called operation tree or White Tree in RDBMS documentation); and a Query Execution layer For an unoptimized query graph, the accelerator takes an all-or-nothing approach with query processing where the MySQL parse tree is inspected to see whether all operations can be done in the accelerator. If so, the parse tree is translated into the accelerator's internal query graph representation using a bridge module.

As an extension of this all or nothing approach, the embodiments may have an implementation by which a query is broken into fragments each of which is executed either in the accelerator or MySQL. Data is exchanged between the two using temporary relations to store results from the query fragments.

For an optimized query graph, instead of integrating at the parse tree level, integration can be performed by a post optimizer (join enumeration). This has the advantage of being able to make a cost based decision of what fragments of the query should be executed.

This can be implemented in the optimizer code and the optimizer needs to be aware of the QPM and the associated cost models. One way to do this in a modular way is for the optimizer not to be exposed to the internal details of the QPM execution (which is left up to the accelerator optimizer). New operations may be modeled in addition to the existing access and join methods that the RDBMS already has. The QPM cost models can be exposed to the optimizer allowing it to cost the operations in its regular join enumeration algorithm.

Another option is to delay the integration point to later in the query processing so that the compiler mostly stays out of the picture and the integration is done at query execution layer by dispatching certain operations to the QPM.

For example, the White tree may be converted into an EVL tree, which can be interpreted or translated further into machine code. A layer translates for the EVL (or machine) code to QPM execution plan, which is a dataflow graph of MOPs and SOPs.

In this approach, the accelerator specific rewrites are leveraged to allow the computation to happen in compressed domain. Another rewrite layer may be added to perform these operations on the MOP-SOP graph directly instead of the query graph layer.

Figure 18:
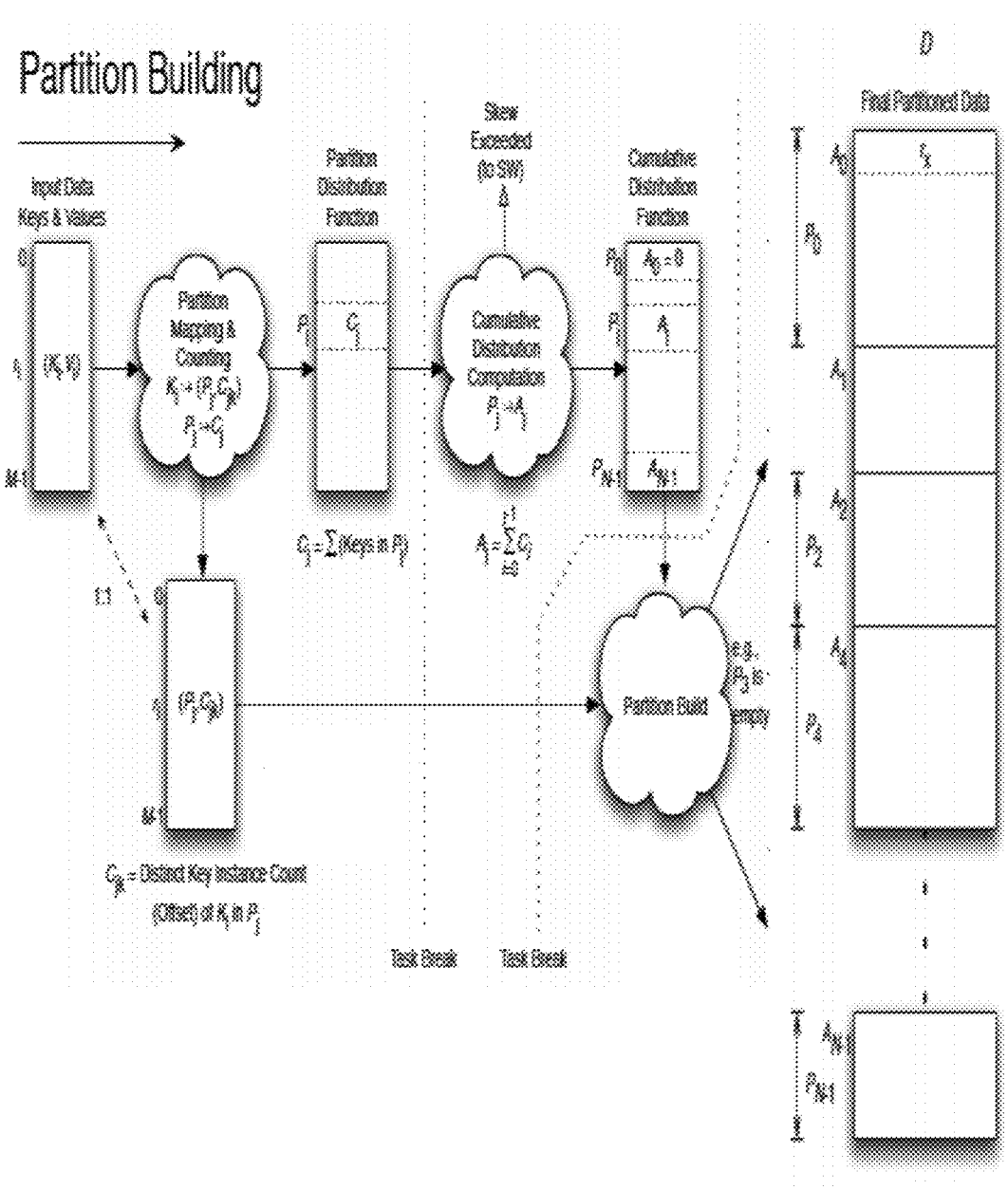
FIG. 18 shows an example of hardware partitioning by an embodiment of the present invention.

FIG. 18 shows an example of hardware partitioning by an embodiment of the present invention. In particular, static and dynamic partitioning of base table columns and indexes across QPMs/CSMs may be built using MOPs. For example, given M input key/value pairs ($K_i$, $V_i$), a MOP may map each key instance $K_i$ into a partition $P_j$ of a possible N partitions. While doing so, each K may be assigned a unique sequential offset $C_{jk}$ within its partition. In order to build the partition, a cumulative distribution point $A_j$ for each partition $P_j$ may be computed by the MOP. If there is an excessive skew, then the MOP may refer this operation to a SOP or other software. The original key instance or reference is then mapped into the partition space being built, such that each reference is at its unique Cjk from its partition address Aj.

Figure 19:
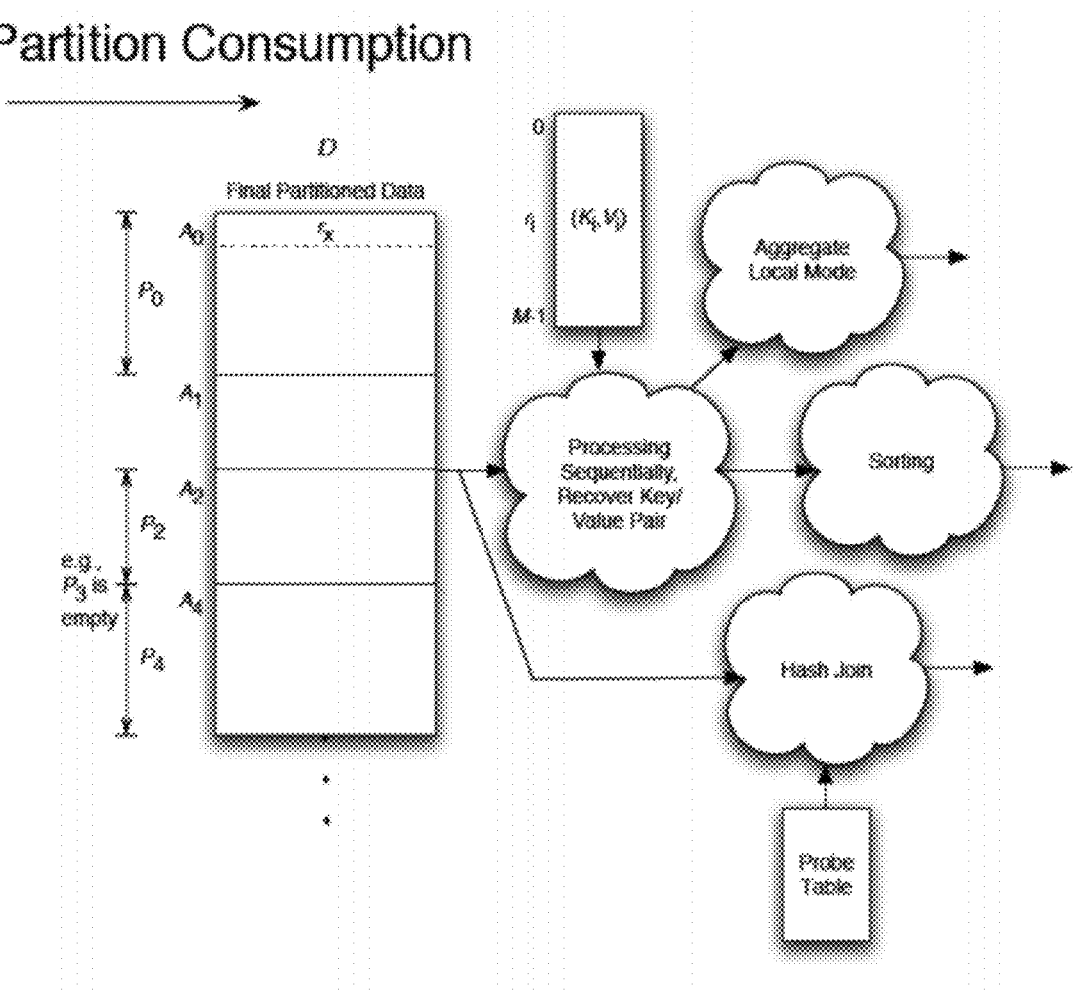
FIG. 19 shows an example of partition consumption according to an embodiment of the present invention.
Figure 20:
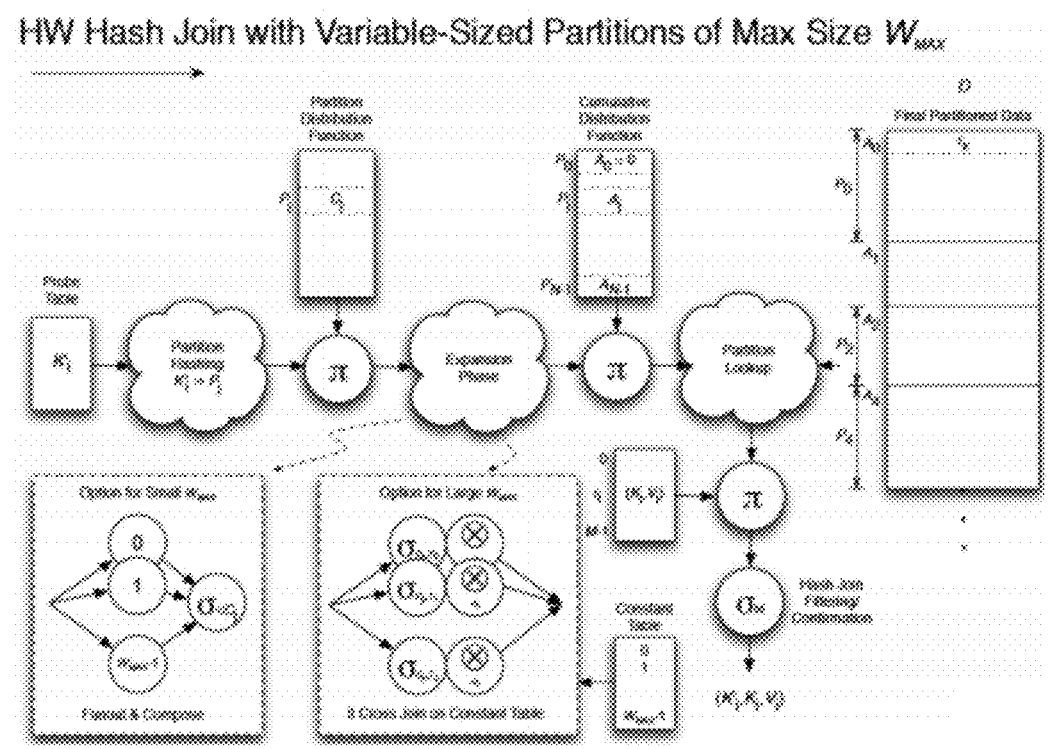
FIG. 20 shows an example of a hardware hash join according to an embodiment of the present invention.

Referring now to FIG. 19, once the partition is built it may be consumed by a MOP or SOP. For example, as shown, information in the partition may be consumed by MOPS for aggregation, sorting, a hash join, and the like. FIG. 20 shows an example of a hardware hash join according to an embodiment of the present invention.

Other embodiments of the invention may be apparent to those skilled in the art from consideration of the specification and practice of the invention disclosed herein. It is intended that the specification and examples be considered as exemplary only.

What is claimed is:

1. A method for integrating relational database operations through a hardware accelerator coupled with a host system running a relational database management system for a relational database, said method comprising:
   receiving a relational query having one or more tasks related to at least one row of the relational database;
   compiling the tasks into a program of database machine code operations specifying a stream of operations for the tasks;
   executing the program of database machine code operations in a dataflow architecture query processing module implemented using said hardware accelerator, wherein the dataflow architecture query processing module includes at least one node configured to receive and process its input as data configured to arrive from at least one other node associated with the at least one node, and wherein said database machine code operations are executed within said hardware accelerator without software; and
   providing a result for the tasks based on the program of database machine code operations.

2. The method of claim 1, wherein the program of database machine code operations are configured to convert rows of data into a column store format.

3. The method of claim 1, wherein the program of database machine code instructions are configured for compression of data from the relational database.

4. The method of claim 1, wherein the program of database machine code instructions are configured for decompression of data from the relational database.

5. The method of claim 1, wherein the program of database machine code instructions are configured for encryption of data from the relational database.

6. The method of claim 1, wherein the program of database machine code instructions are configured for a projection operation.

7. The method of claim 1, wherein the program of database machine code instructions are configured for a predicate filtering operation.

8. The method of claim 1, wherein the program of database machine code instructions are configured for a groupby aggregation.

9. The method of claim 1, wherein the program of database machine code instructions are configured for an orderby limit operation.

10. The method of claim 1, wherein the program of database machine code instructions are configured for a hash join operation.

11. The method of claim 1, wherein the program of database machine code instructions are configured for a sorted merge join operation.

12. The method of claim 1, wherein the program of database machine code instructions are configured for a merge sort operation.

13. A method for integrating relational database operations through a hardware accelerator coupled with a host system running a relational database management system for a relational database, said method comprising:
   receiving a relational query having one or more tasks related to at least one row of the relational database;
   compiling the tasks into a program of database machine code operations specifying a stream of operations for the tasks;
   executing the program of database machine code operations in a dataflow architecture query processing module implemented using said hardware accelerator, wherein the program of database machine code operations are configured to convert rows of data into a column store format; and
   providing a result for the tasks based on the program of database machine code operations.

14. The method of claim 13 wherein the program of database machine code instructions are configured for compression of data from the relational database.

15. A computing device that includes:
   a hardware accelerator; and
   one or more processors configured to:
      integrate relational database operations through the hardware accelerator when coupled with a host system running a relational database management system for a relational database;
      receive a relational query having one or more tasks related to at least one row of the relational database;
      compile the tasks into a program of database machine code operations specifying a stream of operations for the tasks;
      execute the program of database machine code operations in a dataflow architecture query processing module implemented using said hardware accelerator, wherein the dataflow architecture query processing module includes at least one node configured to receive and process its input as data configured to arrive from at least one other node associated with the at least one node, and wherein said database machine code operations are executed within said hardware accelerator without software; and
      provide a result for the tasks based on the program of database machine code operations.

16. The computing device of claim 15, wherein the program of database machine code operations are configured to convert rows of data into a column store format.

17. The computing device of claim 15, wherein the program of database machine code instructions are configured for compression of data from the relational database.

18. The computing device of claim 15, wherein the program of database machine code instructions are configured for decompression of data from the relational database.

19. The computing device of claim 15, wherein the program of database machine code instructions are configured for encryption of data from the relational database.

20. The computing device of claim 15, wherein the program of database machine code instructions are configured for a projection operation.

21. The computing device of claim 15, wherein the program of database machine code instructions are configured for a predicate filtering operation.

22. The computing device of claim 15, wherein the program of database machine code instructions are configured for a groupby aggregation.

23. The computing device of claim 15, wherein the program of database machine code instructions are configured for an orderby limit operation.

24. The computing device of claim 15, wherein the program of database machine code instructions are configured for a hash join operation.

25. The computing device of claim 15, wherein the program of database machine code instructions are configured for a sorted merge join operation.

26. The computing device of claim 15, wherein the program of database machine code instructions are configured for a merge sort operation.

27. A non-transitory computer readable storage medium storing at least executable code for integrating relational database operations through a hardware accelerator coupled with a host system running a relational database management system for a relational database, wherein when executed the executable code causes:

receiving a relational query having one or more tasks related to at least one row of the relational database;

compiling the tasks into a program of database machine code operations specifying a stream of operations for the tasks;

executing the program of database machine code operations in a dataflow architecture query processing module implemented using said hardware accelerator, wherein the dataflow architecture query processing module includes at least one node configured to receive and process its input as data configured to arrive from at least one other node associated with the at least one node, and wherein said database machine code operations are executed within said hardware accelerator without software; and providing a result for the tasks based on the program of database machine code operations.

28. The non-transitory computer readable storage medium of claim 27, wherein the program of database machine code operations are configured to convert rows of data into a column store format.

29. The non-transitory computer readable storage medium of claim 27, wherein the program of database machine code instructions are configured for compression of data from the relational database.

30. The non-transitory computer readable storage medium of claim 27, wherein the program of database machine code instructions are configured for decompression of data from the relational database.

31. The non-transitory computer readable storage medium of claim 27, wherein the program of database machine code instructions are configured for encryption of data from the relational database.

32. The non-transitory computer readable storage medium of claim 27, wherein the program of database machine code instructions are configured for a projection operation.

33. The non-transitory computer readable storage medium of claim 27, wherein the program of database machine code instructions are configured for a predicate filtering operation.

34. The non-transitory computer readable storage medium of claim 27, wherein the program of database machine code instructions are configured for a groupby aggregation.

35. The non-transitory computer readable storage medium of claim 27, wherein the program of database machine code instructions are configured for an orderby limit operation.

36. The non-transitory computer readable storage medium of claim 27, wherein the program of database machine code instructions are configured for a hash join operation.

37. The non-transitory computer readable storage medium of claim 27, wherein the program of database machine code instructions are configured for a sorted merge join operation.

38. The non-transitory computer readable storage medium of claim 27, wherein the program of database machine code instructions are configured for a merge sort operation.

* * * * *